Oct. 15, 1963  A. L. WADE  3,106,982
METHOD AND APPARATUS FOR CREATING A SEISMIC SOURCE
Filed May 9, 1960  17 Sheets-Sheet 1
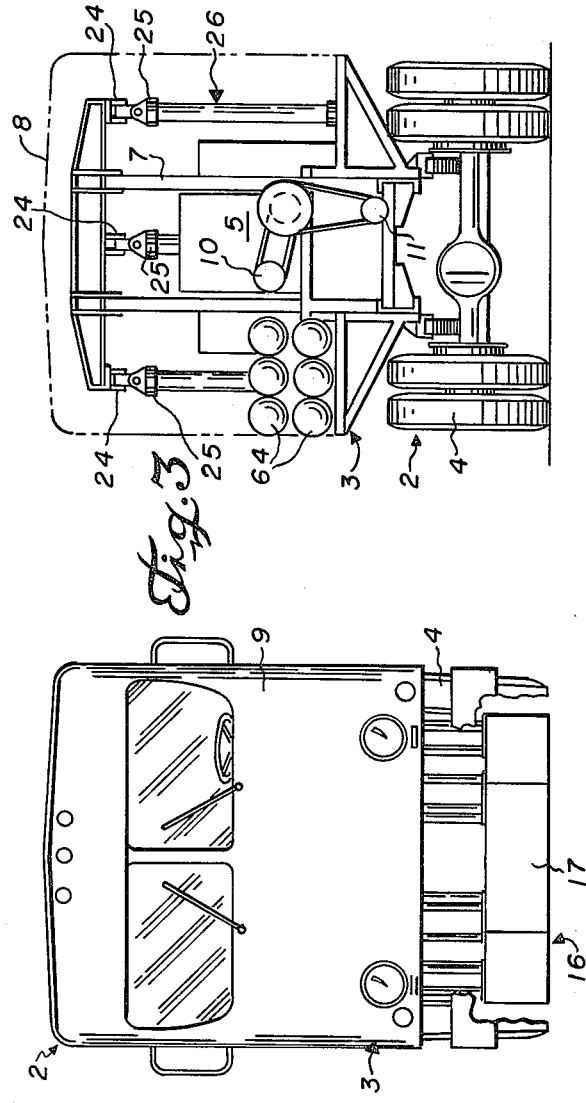
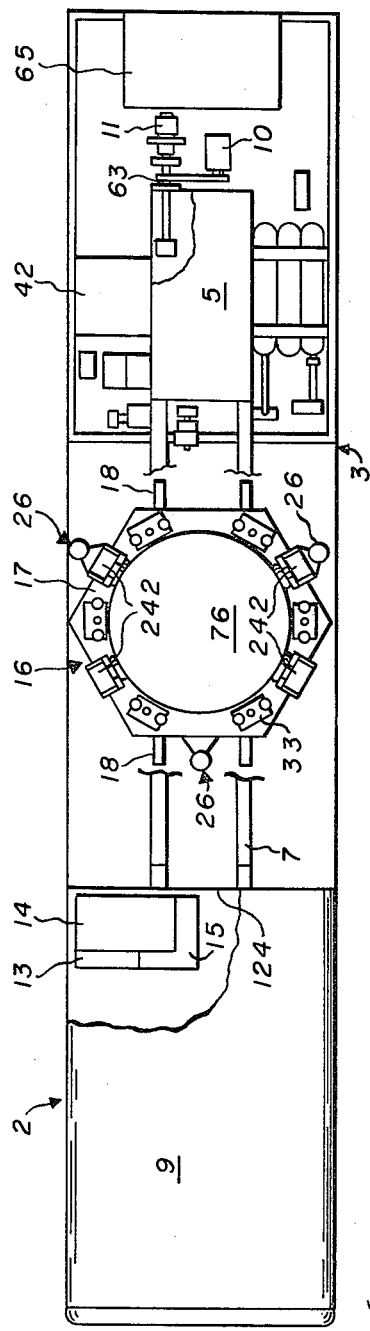
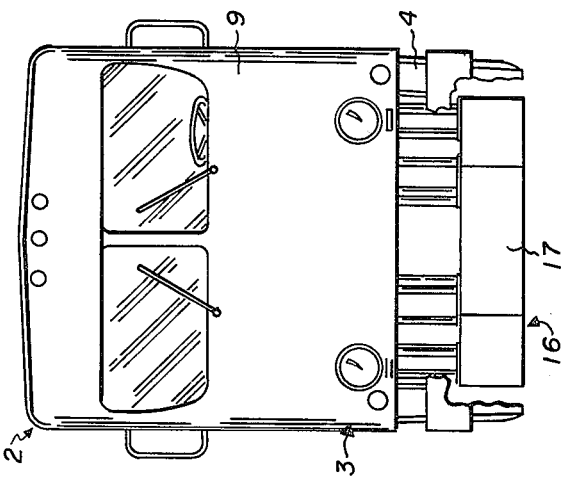
INVENTOR.
Albert L. Wade
BY
TD Copeland Jr.
Agent Oct. 15, 1963 A. L. WADE 3,106,982
METHOD AND APPARATUS FOR CREATING A SEISMIC SOURCE
Filed May 9, 1960 17 Sheets-Sheet 2

INVENTOR.
Albert L. Wade
BY
T. D. Copeland Jr.
Agent

Oct. 15, 1963   A. L. WADE   3,106,982
METHOD AND APPARATUS FOR CREATING A SEISMIC SOURCE
Filed May 9, 1960   17 Sheets-Sheet 3

INVENTOR.
Albert L. Wade
BY
J. W. Copeland Jr.
Agent

Oct. 15, 1963    A. L. WADE    3,106,982
METHOD AND APPARATUS FOR CREATING A SEISMIC SOURCE
Filed May 9, 1960    17 Sheets-Sheet 4

INVENTOR.
Albert L. Wade
BY
*T. D. Copeland Jr.*
Agent

Oct. 15, 1963 A. L. WADE 3,106,982
METHOD AND APPARATUS FOR CREATING A SEISMIC SOURCE
Filed May 9, 1960 17 Sheets-Sheet 7

INVENTOR.
Albert L. Wade
BY
*H.D.Copeland Jr.*
Agent

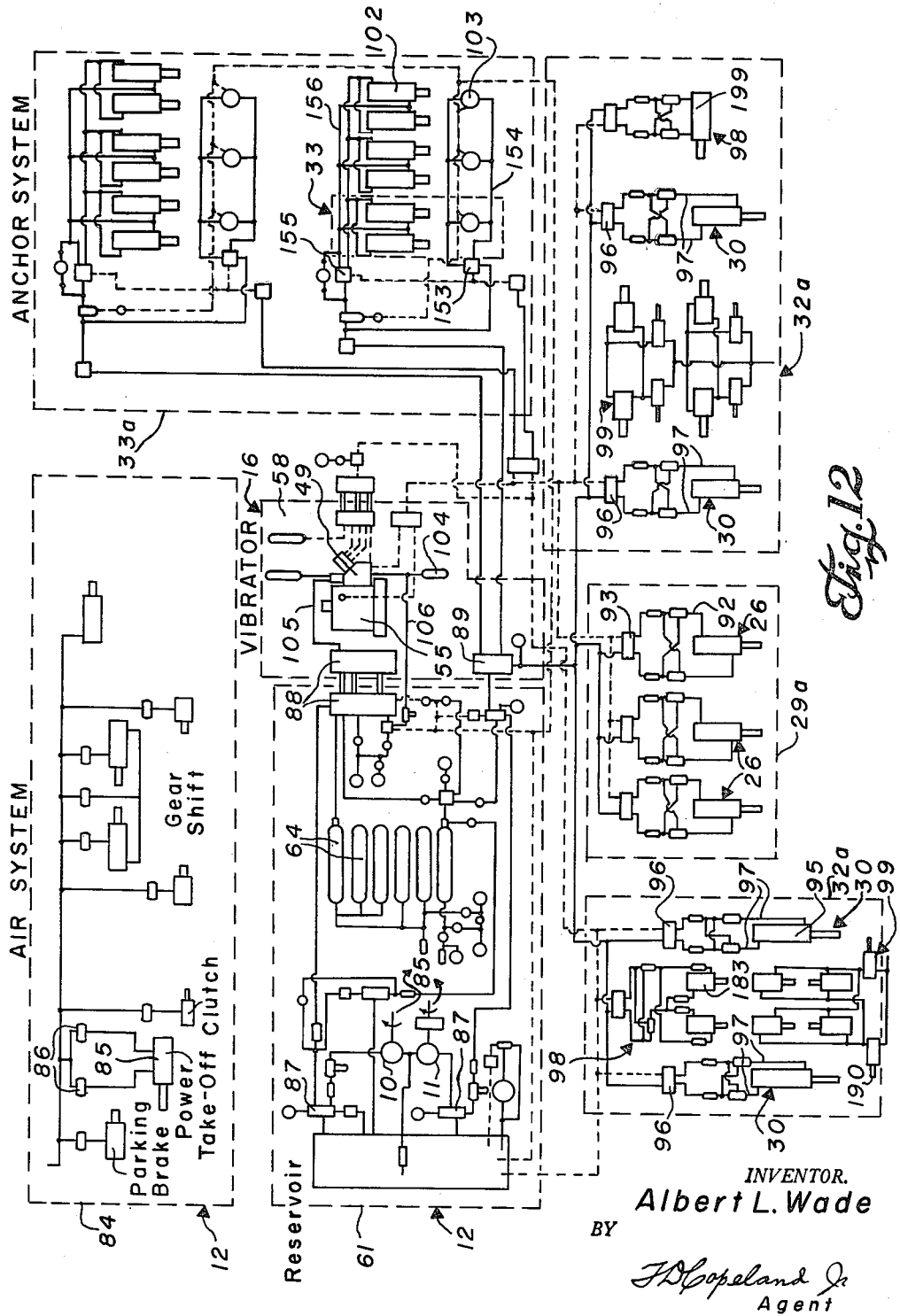

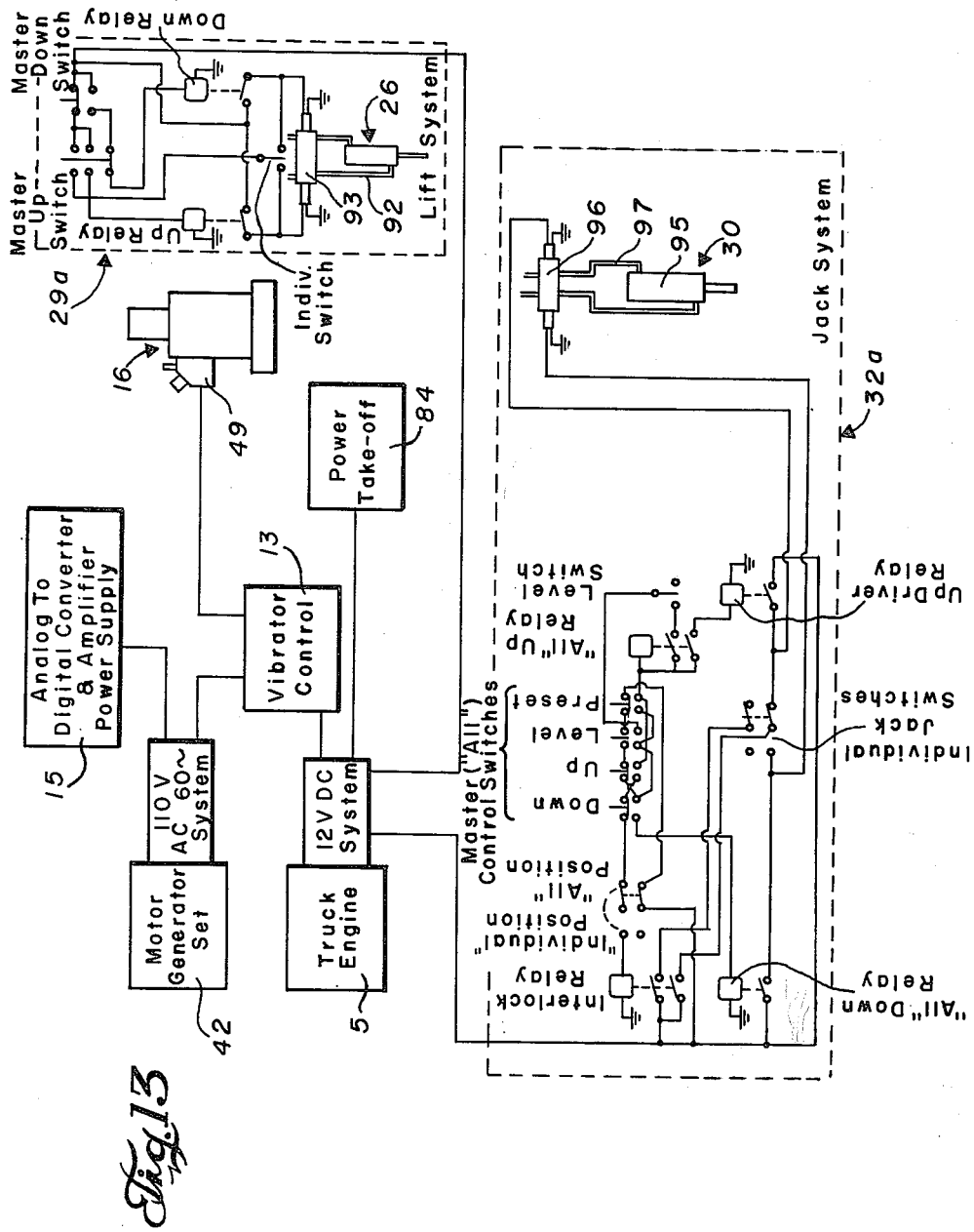

Oct. 15, 1963   A. L. WADE   3,106,982
METHOD AND APPARATUS FOR CREATING A SEISMIC SOURCE
Filed May 9, 1960   17 Sheets-Sheet 11

INVENTOR.
Albert L. Wade
BY
J. D. Copeland Jr.
Agent

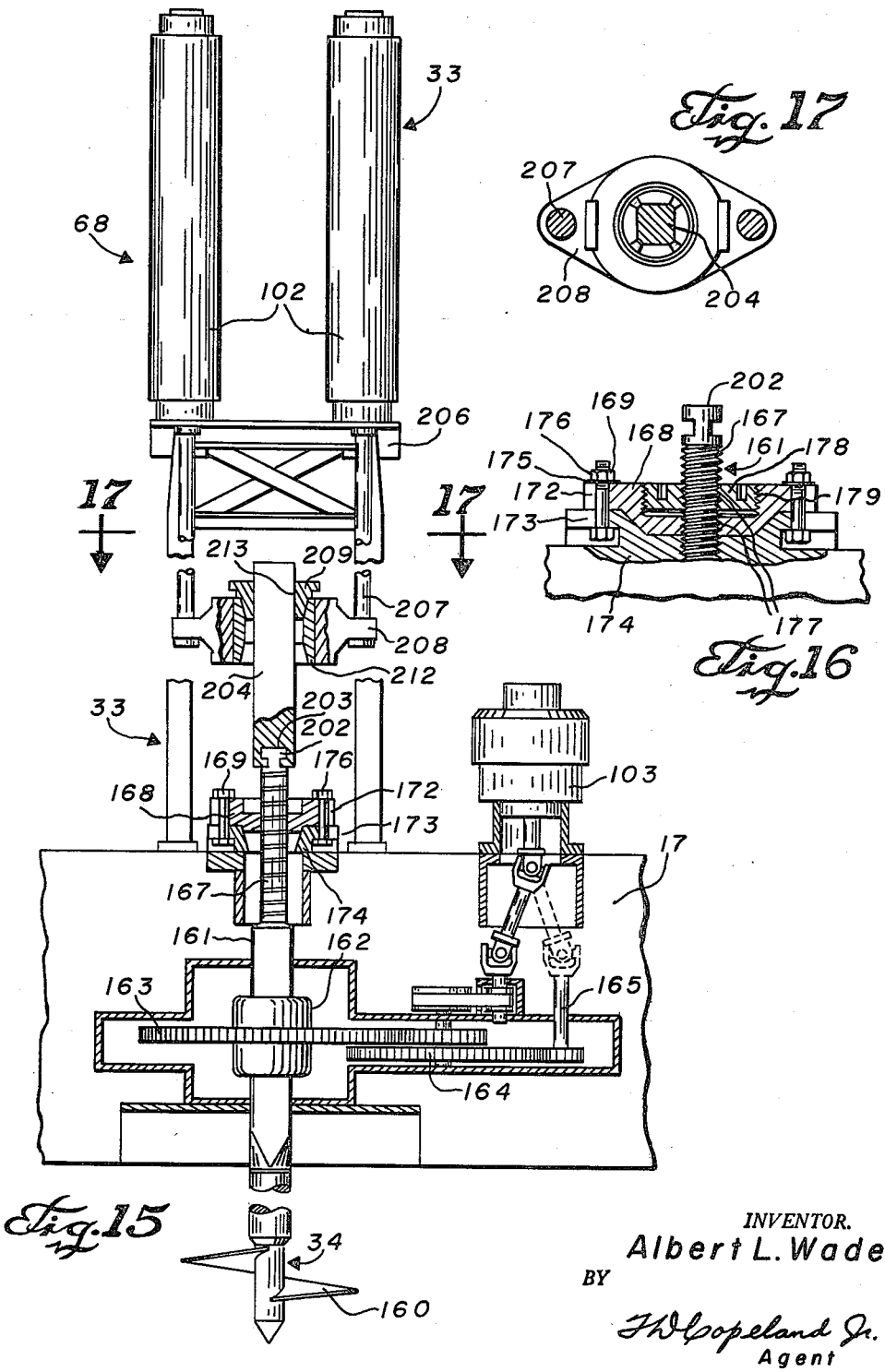

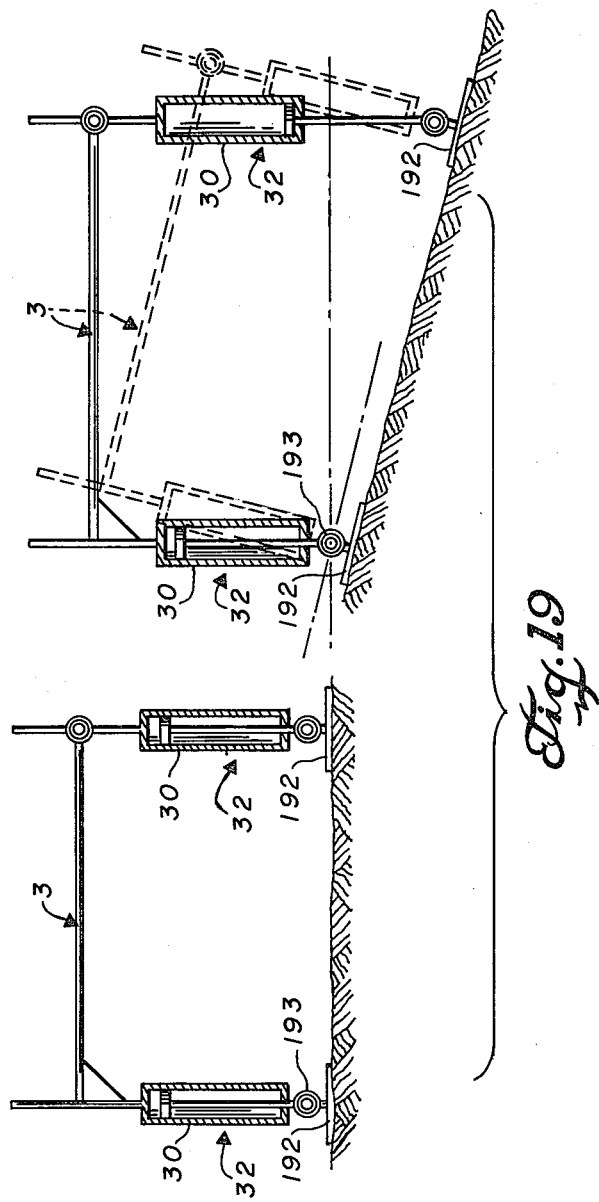

Oct. 15, 1963    A. L. WADE    3,106,982
METHOD AND APPARATUS FOR CREATING A SEISMIC SOURCE
Filed May 9, 1960    17 Sheets-Sheet 14
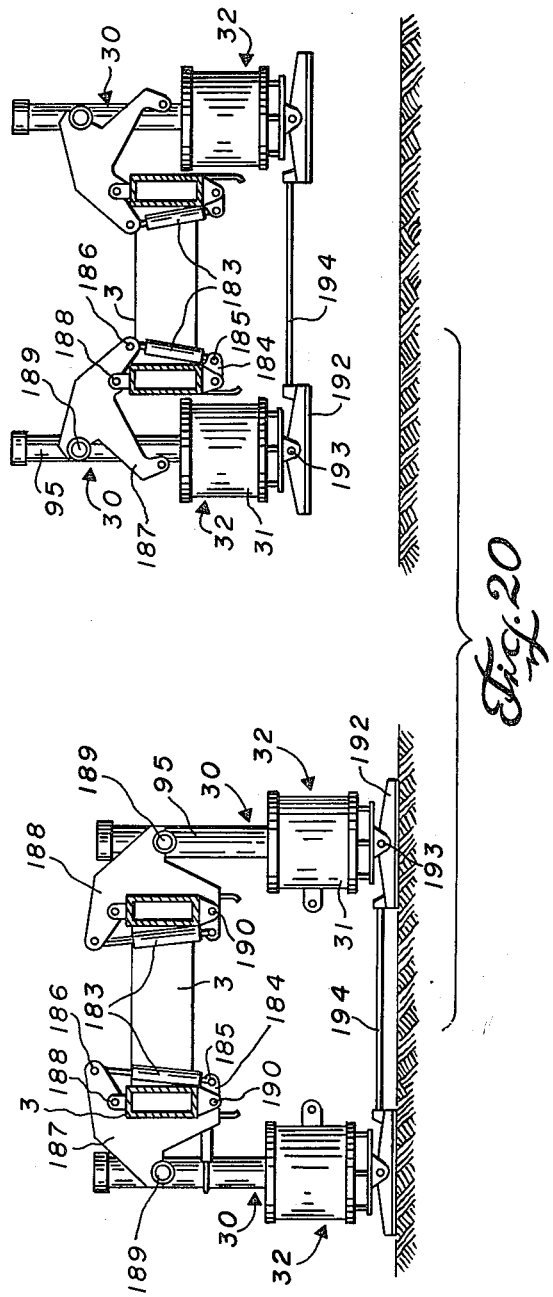
INVENTOR.
Albert L. Wade
BY
H D Copeland Jr.
Agent

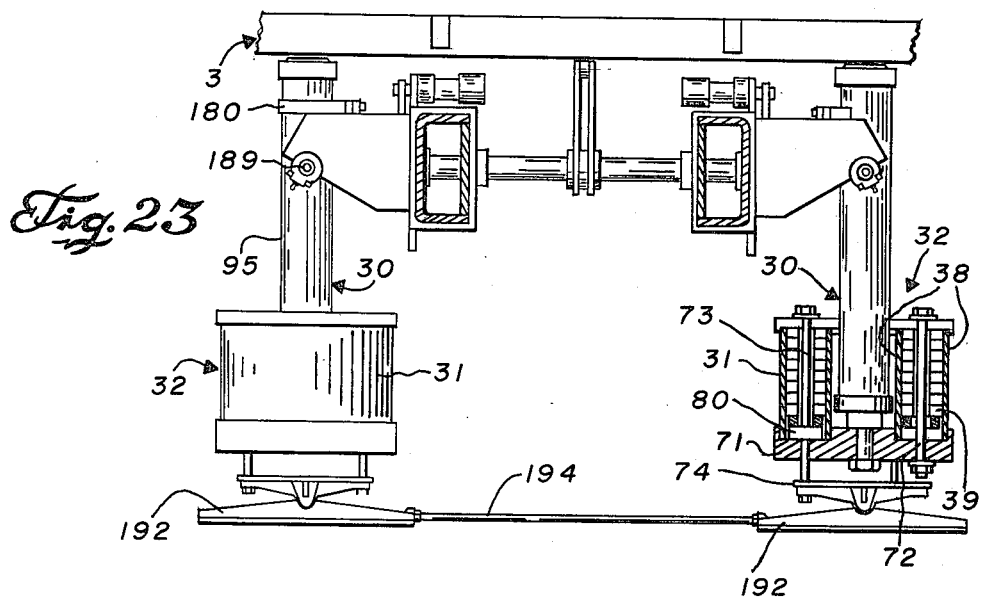
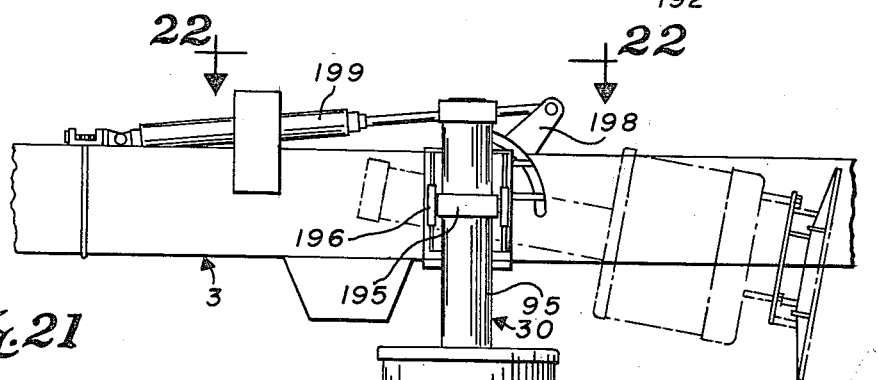
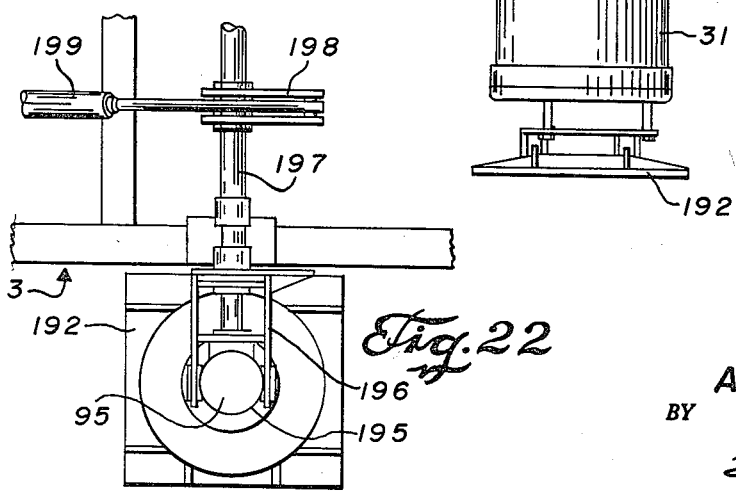

Oct. 15, 1963 A. L. WADE 3,106,982
METHOD AND APPARATUS FOR CREATING A SEISMIC SOURCE
Filed May 9, 1960 17 Sheets-Sheet 16

INVENTOR.
Albert L. Wade
BY
F.D. Copeland Jr.
Agent

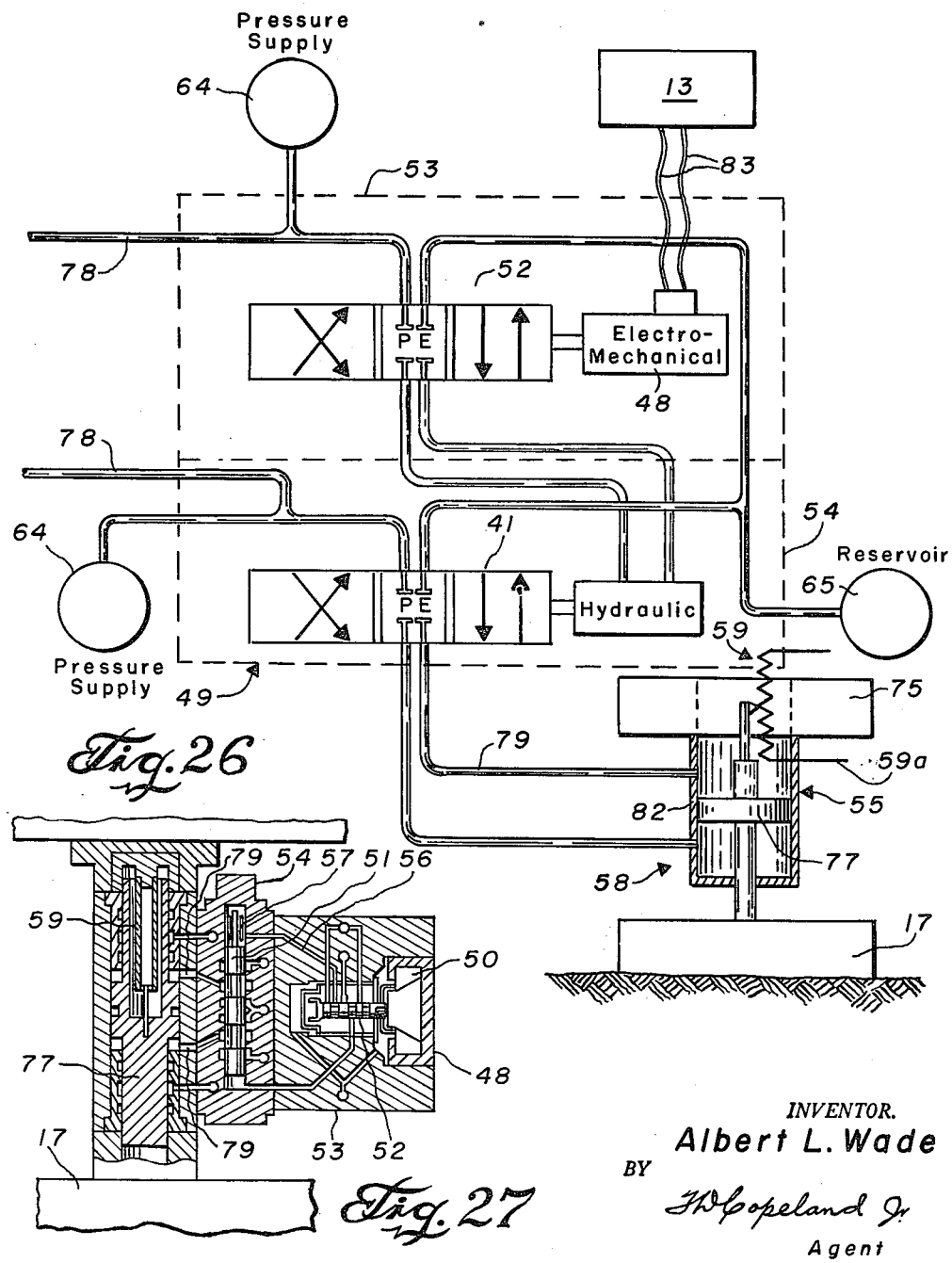

3,106,982
METHOD AND APPARATUS FOR CREATING
A SEISMIC SOURCE
Albert L. Wade, Dallas, Tex., assignor to Texas Instruments Incorporated, Dallas, Tex., a corporation of Delaware
Filed May 9, 1960, Ser. No. 27,789
4 Claims. (Cl. 181—0.5)

This invention relates generally to a method and apparatus for creating a seismic source, and more particularly to a method and means of creating a seismic source of substantial energy without the use of explosives of any nature.

A primary object of this invention is to provide a method and apparatus for creating a seismic source in which action the principal parameters (amplitude, frequency, and duration) of the vibration signal are selectively variable to provide a desired output of either a continuous wave or a single impulse.

Another object of this invention is to provide a method and apparatus for creating a seismic source in which both the amplitude and frequency of the vibratory signal are adjustable over wide ranges of operation so as to enhance the return signal and permit a greater ease and facility in interpreting the intelligence contained therein.

An additional object is to provide an electronically controlled hydraulic-powered actuator assembly for generating a large vibratory signal for seismic operations.

Yet another object is to provide a large heavy-duty apparatus for generating seismic signals and providing means to readily transport and relocate this seismic source.

An additional object is to provide a heavy-duty seismic source apparatus which is transportable by truck and which, during transportation, forms an integral structural part of the truck frame itself.

Yet another object of this invention is to provide a seismic source actuator which has a hydraulically operated seismic signal generating means therein and which means may be adjusted over a wide range to provide selectable resonant frequencies of the actuator to increase the efficiency and output power of the actuator and thereby permit optimum utilization of available energy in coupling and transmitting the seismic signal into and through the earth.

An additional object of this invention is to provide a seismic source which is capable of generating a seismic signal for a period of time greatly exceeding that obtainable in using explosive means or weight dropping means for generating seismic signals.

Yet an additional object of this invention is to provide a means for generating a vibratory seismic signal in which all of the parameters of the signal including frequency, amplitude, acceleration, velocity, displacement, period or duration of signal, and wave shape may all be selectively varied and may all be varied during the operation of the seismic source at the discretion of the operator.

A still further object of this invention is to provide a seismic source means which is attached directly and firmly to the ground in such a manner that the source means may not move independently of the ground in either an upward or a downward direction.

Another object of this invention is to provide a transportation vehicle which includes all of the control equipment for the operation of the seismic source and yet which vehicle is capable of being totally isolated from vibrations of the seismic source when the latter is in operation, even with the seismic source directly beneath the vehicle.

An additional object is to provide a seismic source which comprises a vibrator that is a double-acting hydraulic actuator which operates between a large upper reaction mass and a lower mass coupled to the ground in such a way that the ground follows directly the motion of the lower mass.

And a further object of this invention is to provide a method and apparatus for hydraulically generating large amplitude seismic signals of a wide range of physical characteristics and further providing an electric means to precisely control the hydraulic generating means.

These and other objects and advantages of this invention will be apparent from an examination of the following specification and drawings in which:

FIGURE 1 is a front elevational view of the seismic source transporting vehicle assembly of this invention showing the vibrator in its lowered position;

FIGURE 2 is a top plan view of the transporting vehicle assembly of FIGURE 1;

FIGURE 3 is a rear elevational view of the vehicle of FIGURES 1 and 2;

FIGURE 12 is a system diagram of the hydraulic and air systems of this invention;

FIGURE 13 is a circuit diagram of the electrical system of this invention in simplified form;

FIGURE 15 is a fragmentary elevational view partly in cross section of the anchoring arrangement shown in FIGURE 6;

FIGURE 16 is a fragmentary sectional view showing the locking nut structure of a preferred embodiment of the device of FIGURE 15;

FIGURE 17 is a cross sectional view taken along the lines 17—17 of FIGURE 15;

FIGURE 19 is a diagrammatic outline view showing the leveling action of the vehicle isolating equipment;

FIGURE 20 is an end elevational view partly in section showing the rear truck jacks and their isolation mounts used in this invention;

FIGURE 21 is a fragmentary side elevational view of the front truck jack and mount of the vehicle of this invention;

FIGURE 22 is a fragmentary top plan view of the jack and mount of this invention taken along the lines 22—22 of FIGURE 21;

FIGURE 23 is an end elevational view of a modified construction of the rear truck jacks as shown in FIGURE 20;

FIGURE 26 is a diagram showing the piping connections between the elements that form the control valve and the actuator of FIGURES 24 and 25; and FIGURE 27 is a fragmentary sectional elevational view of the control valve and actuator of the vibrator assembly of this invention.

Figure 4:
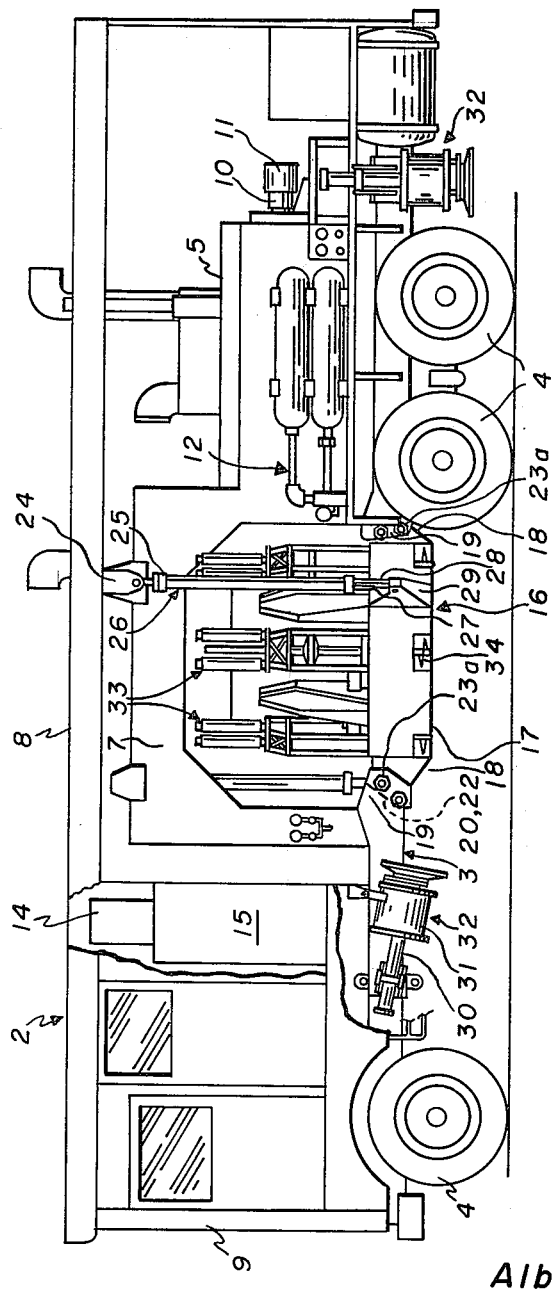
FIGURE 4 is a side elevational view of the vehicle assembly of FIGURES 1–3 showing the vibrator in its transporting or raised position.

Of particular utility in field operation is the ability of this controllable seismic source to first impart a preselected seismic signal into the earth and to receive the reflected signal from the earth with the use of auxiliary equipment, such as the data acquisition apparatus shown in the copending application of Robert S. Foote and George P. Sarrafian entitled, "Method and Apparatus for Obtaining Seismic Data," Serial No. 784,283, filed December 31, 1958, to interpret the received signal with the use of analyzing equipment, such as shown in the copending application of George T. Baker, et. al., entitled, "Computer," Serial No. 784,358, filed December 31, 1958, now U.S. Patent No. 3,074,636, all the mentioned applications being assigned to the assignee of the present invention.

The advantages of the utilization of a seismic system whereby the parameters of the seismic signal, i.e., the amplitude, frequency, duration of the signal, and the wave shape may be controlled are seen by an examination of conventional seismic records in which a plurality of sine waves with superimposed return signals and, in some cases, superimposed noises show up on the continuous recording chart. Considerable difficulty has been and is still being experienced in interpreting the results of conventional seismic methods. However, if the returning seismic signal includes well-defined indicia or abrupt peaks to indicate the return of the reflected signal over and above unwanted signals, it would be comparatively simple for semiskilled personnel to read and interpret these recordings. By utilizing the seismic source apparatus of this invention, which is capable of sending out known seismic signals in which the above-named parameters are controlled, these desirable results and improved techniques in intelligence display on seismic records, as noted in the reference patent applications, are more readily obtainable. This invention deals with a source in which these parameters may not only be preselected and controlled, but which also may be changed and varied during the actual operation. This is accomplished by a hydraulic actuating unit which imparts a vibration into the earth. The control of this hydraulic power is in part obtained by high speed electronic means. These parameters are controlled by changing the flow of hydraulic fluid to the actuator which causes a change in the accelerating force of the vibrating mass or in the velocity of the vibrating mass, or in its displacement. It is the unique combination of the very high speeds, frequencies, instantaneous feedback, and servo control obtainable with electronic equipment that combine with the stability and power furnished by the hydraulic mechanisms of this invention that produces this highly desirable end result.

Another manner in which the actuator of this invention is able to accomplish the results intended is by its specific construction which combines the vibrating mass rigidly and integrally with a portion of the earth itself so that the signal which is sent into the earth will precisely follow the principal parameters of the signal.

The lower mass of the actuator, being anchored to the ground in such a manner as to prevent relative movement in an upward or a downward direction, will impart the desired amplitude, frequency, acceleration, velocity, and duration of the signal into the earth. The wave shape of the signal will also be substantially transmitted into the earth, but a certain degree of filtering will take place before the reflected signal is received. If the lower mass were not rigidly anchored in both directions, then the earth could not respond to the controlled movement of the vibrator assembly at any frequency higher than the natural frequency of the earth. But, by anchoring the lower mass as disclosed herein, the earth is forced to follow the controlled movement of the vibrator, both in a downward direction when the vibrator is pushing against the earth and in an upward direction when the vibrator is pulling on the earth.

Another utilization of the seismic source of this invention is in locating a perimeter of smaller individual seismic sources on the surface of the ground in the area of interest so that the synchronized operation of this plurality of seismic sources will provide results which are better in some aspects than the utilization of a large single actuator. This arrangement utilizes the principles of the antenna theory in radio reception work. One such advantage is that when using a single actuator about 53% of the energy generated by the actuator is lost or dissipated in Rayleigh or surface waves so that surface energy is in the neighborhood of 53% of the total energy that is available in reflection seismology, and the compressional waves only account for about 17% of the total energy of the actuator. The remaining 30% of the energy available goes into shear waves or shear energy which is not utilized in seismic work because of its curved path of travel which would make time recording difficult for one thing, and due to the fact that it is not picked up on the compression-type seismometers. However, when spacing the smaller seismic sources in a perimeter, as described, the amount of energy lost in surface or Rayleigh waves, or surface energy, drops to about 30% of the total energy, and the amount of energy that goes into compressional waves rises to about 30%, and shear waves then make up the balance of the energy which is about 40%. By a comparison between the utilizable compression waves of the two examples, and by providing a directional reinforcement of the seismic waves in a useful mode, it is seen that the latter example is nearly twice as efficient as the single actuator example. In separating the seismometers in the perimeter configuration by a distance that is a multiple of the Rayleigh wave one-half wave length, the surface waves partially cancel each other, and more of the available energy goes into compressional-type waves. This separation can be accomplished by using small ring-shaped masses in surrounding relation to the anchor shafts and between the lower mass and the surface of the earth.

In the preceding paragraph, when a single actuator was used it was noted that, of the total energy available, approximately 53% was in the form of Rayleigh or surface waves which are not utilized in reflection seismology. However, a very beneficial use may be made of this energy in seismic communication. With this purpose in mind, the vibrator assembly 16 becomes a seismic transmitter, and the receiving equipment identified generally at 15 and in circuit with seismometers 37, and located at a substantial distance from the vibrator assembly 16, becomes a seismic receiver. Since the input seismic signals into the ground of the vibrator assembly 16 are variable as to amplitude, frequency, acceleration, velocity, displacement, duration and wave shape, and since these signals are electrically controlled and automatically recorded (in analog or digital fashion), they will provide an excellent media for communication in code without the use of interconnecting cables. Love waves, which are the result of shear waves reflected between layers in the earth's crust at the surface, are also utilizable for communication purposes through the surface of the earth. Another form of propagation of wave forms through the earth are Stoneley waves which travel along an interface, and are used in refraction seismology. These latter will permit communication between two greatly spaced points, both of which overlie the same underground strata. Reflected waves may also be utilized as communication links.

It is possible when utilizing random frequency waves for seismic signals with the device of this invention to provide the received signal with spikes and easily readable amplitudes by using the method of autocorrelation or by using the method of crosscorrelation, which is the subject of the mentioned system patent applications. With the present seismic source, as will be described, a wide variety of signals is obtainable. These may be either random signals, continuous sine wave signals, sine waves which increase and decrease in amplitude, and any other variety of wave shape form and any frequency within the range from zero to about 600 cycles per second. The amplitude of movement of the actuator piston throughout this range is adjustable in both directions from a midposition. The nominal maximum stroke of the actuator piston is one-half inch.

Referring now to the characters of reference of the drawing, it will be observed in FIGURES 1-6 that the complete vehicle assembly of this invention identified generally at 2 includes a large, heavy-duty chassis or main frame 3, which is supported from the ground by pneumatic tired wheels 4, and certain of these wheels are power-driven by means of conventional gear drive and axle assemblies (not shown) which receive their power input from the truck engine 5 mounted above the rear tandem wheels 4; all of the automotive parts not shown in detail or specifically identified are conventional in the automotive art. Added parts and modifications of standard parts will be identified hereinafter.

Figure 6:
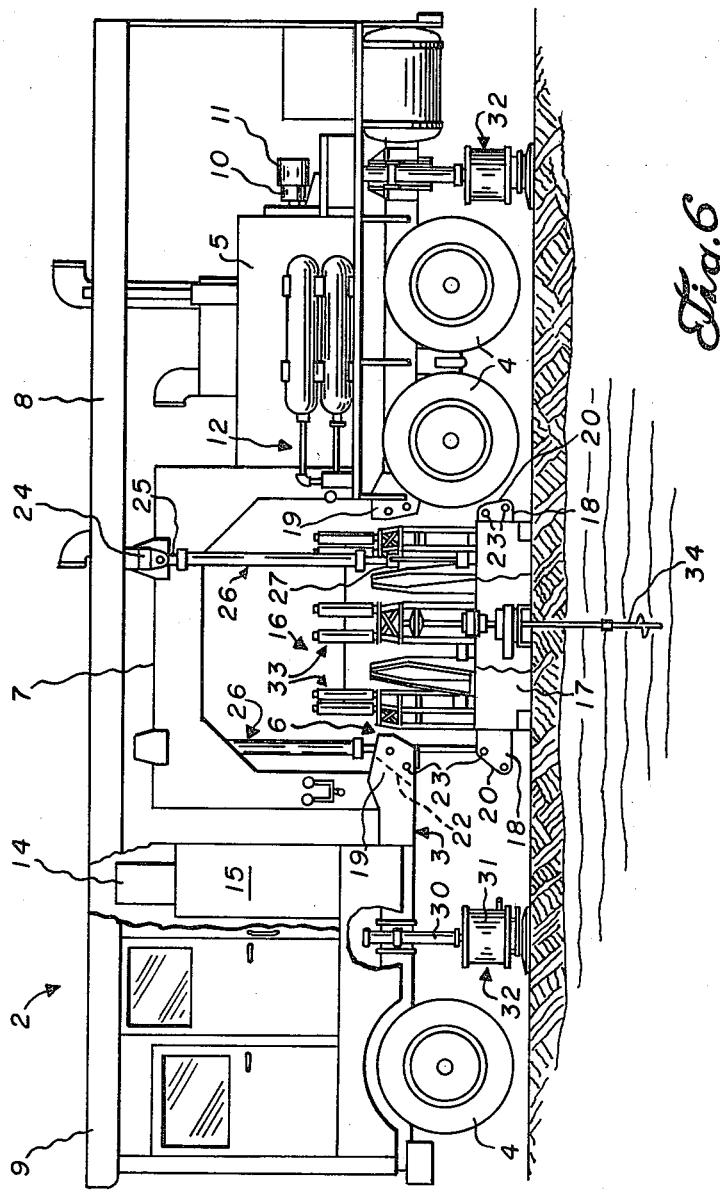
FIGURE 6 is a side elevational view similar to FIGURE 5 but after the vehicle has been raised off the ground and after the vibrator has been rigidly anchored to the earth.

It will be noted in FIGURE 6 that the main frame 3 of this vehicle assembly includes a break or opening 6 in each of its longitudinal members near their mid-point, and a heavily reinforced and inverted U-shaped frame 7 bridges over each break 6, and thus reinforces the main frame 3. A superstructure 8 is supported from the frame 3, and an enclosed cab 9 is formed at the front of the vehicle. Hydraulic pumps 10 and 11 are installed on the vehicle and are driven by engine 5 to supply fluid power to a hydraulic system, identified generally at 12, which forms a functional part of this invention and will be described in greater detail hereinafter.

The cab 9 includes the necessary steering and driving controls (not shown in detail) and includes a vibrator control console 13, an auxiliary equipment panel 14, and electronic signal and power consoles indicated generally at 15 and described in more detail with reference to FIGURE 14.

When the vehicle 2 is in condition for traveling either on or off the highway, as shown in FIGURE 4, the openings 6 of FIGURE 6 are closed by the structural frame of the centrally located vibrator assembly 16. The hexagonal-shaped base 17 of the vibrator assembly 16 includes a pair of laterally spaced yokes 18 which project out from the base 17 at each longitudinal end thereof, and each yoke 18 is centrally aligned with a bifurcated bracket 19 on the main frame 3. The yokes 18 include a top edge 20 bevelled at each long corner to provide a self-centering juncture when raised into the inwardly bevelled lower edge 22 of the brackets 19. When the parts 18 and 19 have been aligned to such an extent that their cooperating bolt holes 23 coincide, a pair of lock-pins 23a are installed at each of the four connections. The upper portion of the inverted U-shaped frame 7 includes three equilaterally spaced brackets 24 which pivotally support the cylinder ends 25 of three vertically depending lift cylinder assemblies 26. The lower piston ends 27 of the assemblies 26 are link- and pin-connected at 28 to projecting brackets 29 (see FIGURE 24) on the base 17 which align vertically with the upper brackets 24. These lift cylinder assemblies are adapted to be operated from the auxiliary equipment control panel 14 in the cab 9 by means of the hydraulic system 12, as shown in FIGURE 12, to raise or lower the vibrator assembly 16. From the above description, it will be observed that the relatively heavy base 17 of the vibrator assembly 16 reinforces and strengthens the main frame 3 at the time the vehicle is traveling on and off the road in transporting the seismic source vibrator assembly 16 to a selected location. When the vehicle reaches the location where seismic exploration is to be conducted, and when the vibrator assembly 16 is uncoupled from the main frame 3, exposing the opening 6, the vehicle will thereafter remain stationary and no reinforcement is necessary. Thus, it will be seen that the arrangement described not only provides a rigid and stable means of transporting the vibrator assembly 16 in such a position as to be ready for immediate use by the operator, but it also provides a structural reinforcement for vehicle frame during the transportation stage of its operation.

Figure 5:
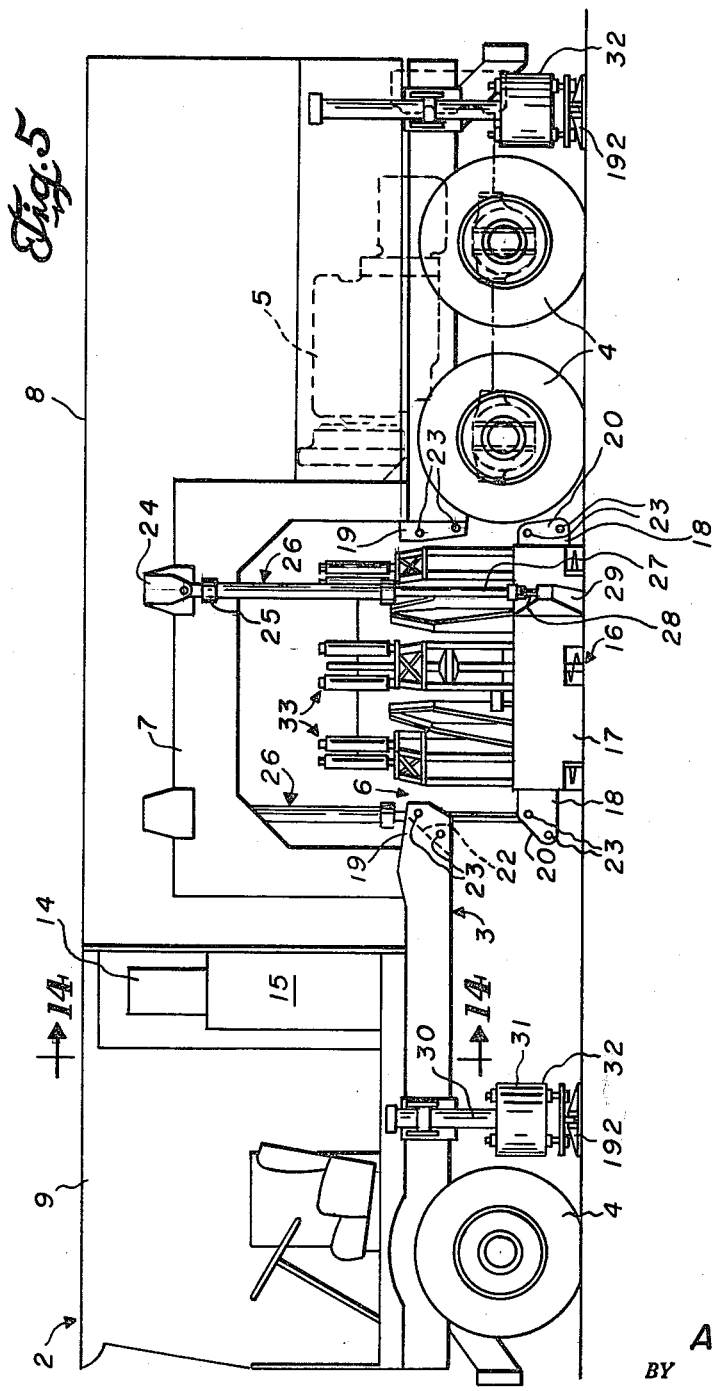
FIGURE 5 is a side elevational view similar to FIGURE 4 but showing the vibrator in its lowered position and preparatory to raising the vehicle to its isolated position.

After the vehicle has stopped at the site of operations, the vibrator assembly 16 is raised by means of cylinder assemblies 26 sufficient to take the weight off pins 23a. The pins 23a are then uncoupled, and the vibrator assembly 16 is lowered slightly (by means of cylinder assemblies 26). At this point, each isolation mount and jack assembly 32 is uncoupled from its stowed position and lowered to the ground, as shown in FIGURE 5. Each assembly 32 includes a hydraulic jack 30 and a vibration damping assembly 31. By means of the hydraulic system 12, the jacks 30 are extended, and the vehicle assembly 2 is raised completely off the ground. Leveling of the vehicle is accomplished at this point through individual control of each jack 30, as shown in FIGURES 12 and 19. With the vehicle thus completely off the ground, the considerable weight of the vibrator assembly 16 suspended from the top portion of frame 7 will cause frame 7 to bow out slightly at its lower end. The vibrator assembly 16 is then lowered to the ground, and the lift cylinder assemblies 26 are uncoupled at 28 so that the vibrator assembly is now freed from the vehicle, and at this point, the vehicle is isolated from the ground.

The next step in preparation for using the vibrator is to rigidly couple the lower mass or base 17 of vibrator assembly 16 to the ground to form a rigid integral connection with the earth to insure that each upward, as well as downward, movement of the lower mass 17 is directly transmitted into the earth at whatever frequency the base 17 vibrates. It has been found that, unless the base 17 is rigidly coupled to impart a forced vibration to the earth, there will be an uncontrolled impact or "slapping" action between the bottom of the base 17 and the surface of the earth whenever the upward velocity of the base 17 exceeds the speed of response of the earth due to its natural elasticity. In practice, it has been found that the acceleration of the base 17 exceeds this speed of response of the earth in the range of operating frequencies (these frequencies being from zero to about 600 cycles per second). In order to accomplish this rigid coupling with the earth, there has been provided a plurality of anchor assemblies 33 which are operated from controls 153 and 155 (see FIGURE 12), located on the vibrator assembly 16, to power drive a helical anchor 34 several feet into the earth (3.5 ft. in one embodiment), as seen in FIGURE 6, to thus provide one element of the rigid coupling required for the optimum operation of the vibrator assembly. These anchor assemblies 33 are tantamount to six little rotary drill rigs in which a vertical force either up or down is applied while the anchor screw is being rotated by the gear train (164 of FIGURE 15) which coresponds to a rotary table in drill rig operations. For loose sand, a helical blade 160 ten inches in diameter is used, whereas in firmer soil the normal blade eight inches in diameter is employed.

Once the vibrator assembly is properly anchored to the ground, as will be more fully described with reference to FIGURES 15 and 16, and the vehicle is isolated from the ground on mount assemblies 32, the operator will send the desired electrical signal from the signal generator 45 to the electrically-driven hydraulic control valve 49 which, in turn, will cause the vibrator assembly 16 to respond to the frequency, amplitude, and wave shape of the electrical signal. The resulting movement of the lower mass of the vibrator assembly 16, which is the base 17 plus a mass of the adjacent earth, will transmit seismic signals into the earth which are reflected in a well-known manner from underground strata to a plurality of spaced seismometers 37, the output of which is transmitted to receiving equipment 15 located inside the cab 9. One type of data receiving and handling equipment that is satisfactory for this installation is that shown in the previously mentioned copending application of Robert S. Foote, et al., entitled, "Method and Apparatus for Obtaining Seismic Data." The operator may set in the signal desired at the output of the signal generator by manual controls, and this signal may be changed during a test period to fit conditions encountered during the test. The seismic signals thus imparted into the earth may vary from a single impulse of one-half cycle duration or less to a continuous wave for a period of about five seconds and having a frequency within the range of zero to about six-hundred cycles per second. The optimum values of frequency, amplitude, wave shape and duration of the input signal will depend on the ground conditions and other fractors encountered at a particular test site and by virtue of the adjustments and ranges provided in the equipment of this invention, optimum results may be obtained in each seismic survey. When the vibrator is to be anchored to solid rock, the little rotary drill rigs are actually employed to drill a relatively shallow hole (to about one foot deep). The helical anchors are first replaced by a rock drill, which is, in turn, replaced by an expansion joint.

An examination of the construction of the various components that make up this invention in greater detail may be made by reference to the separate figures of the drawing.

Figure 7:
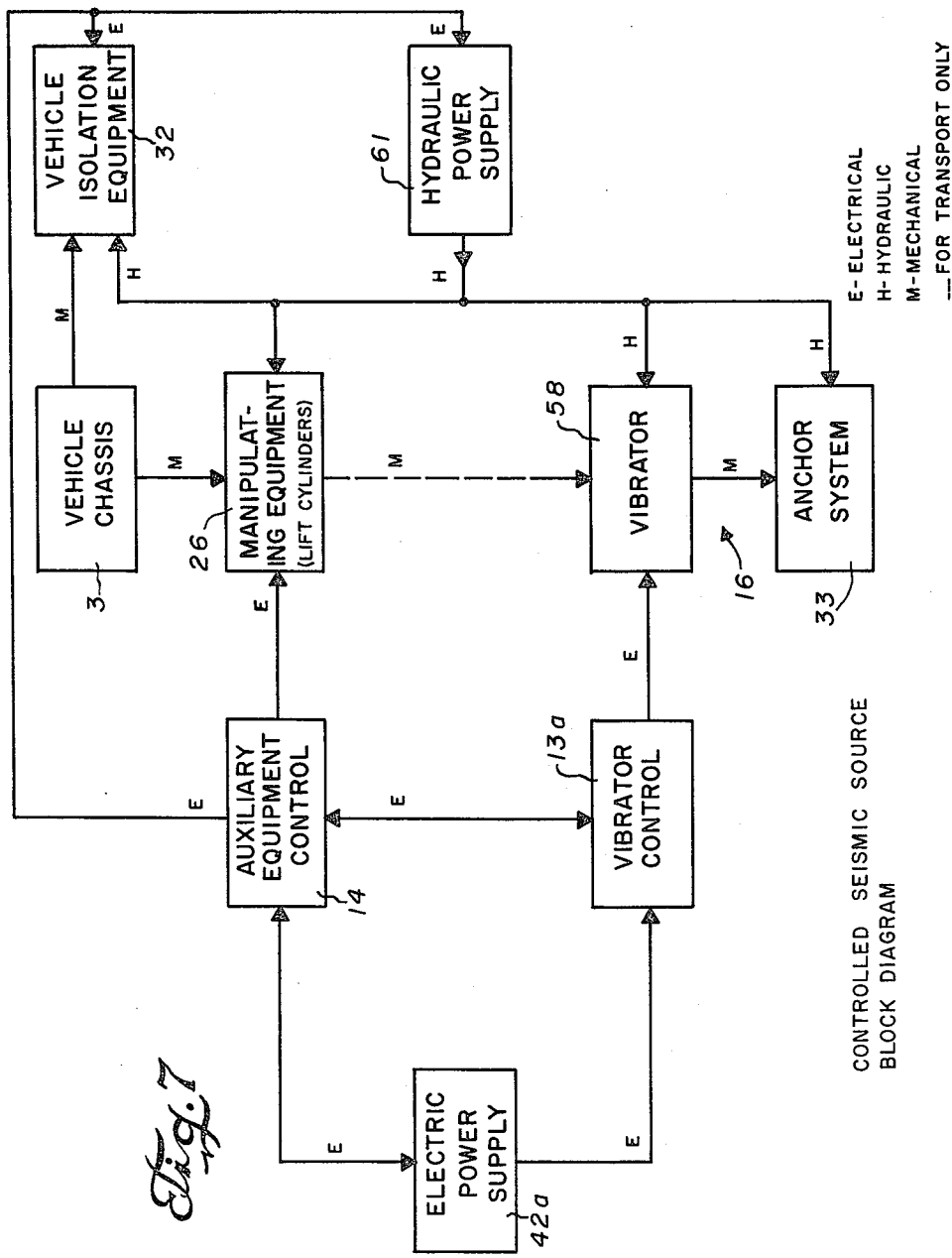
FIGURE 7 is a block diagram of the controlled seismic source and associated equipment.
Figure 8:
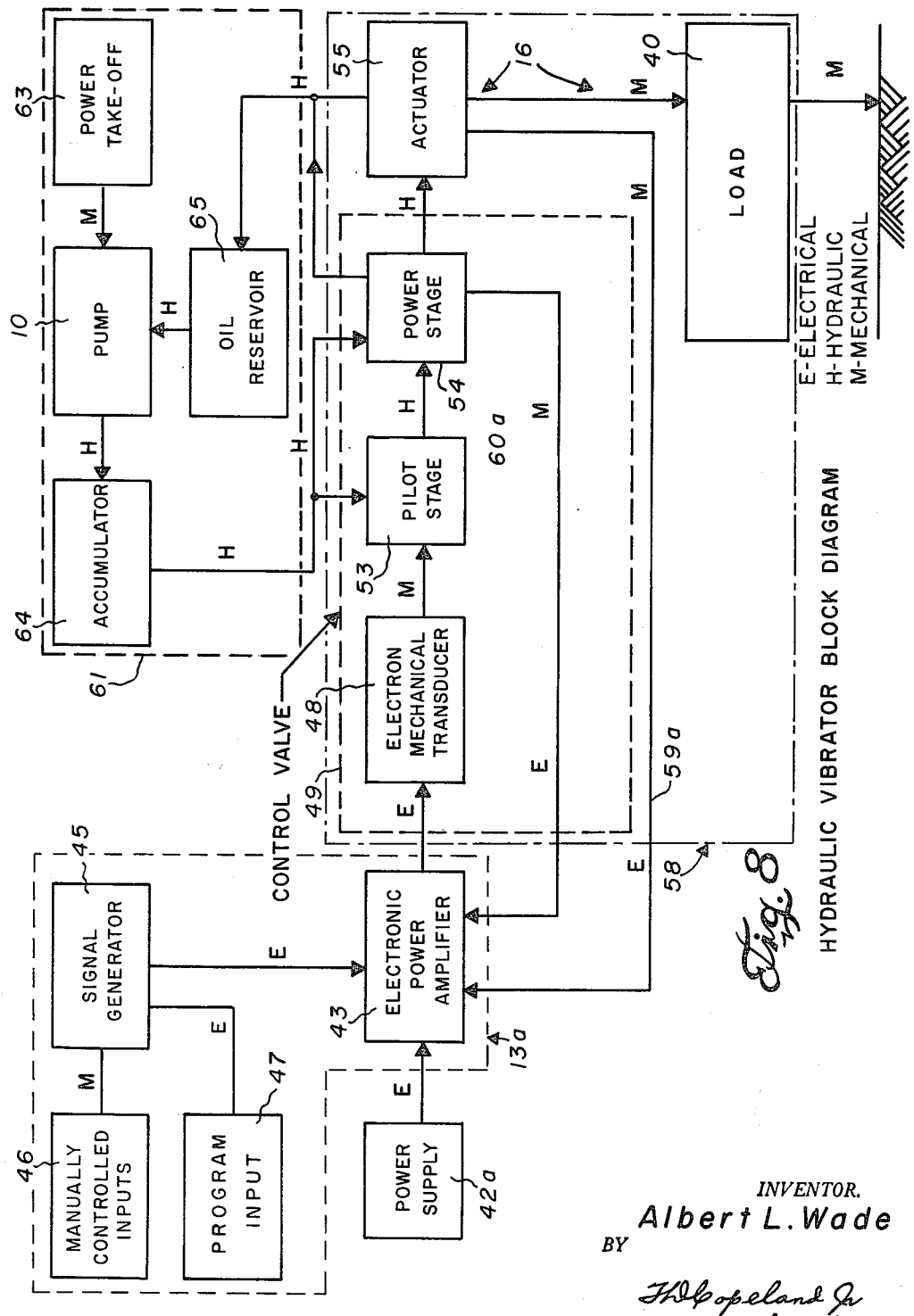
FIGURE 8 is a block diagram of the hydraulic vibrator of FIGURE 7 showing its related equipment in greater detail.

In FIGURES 7 and 8, and in conjunction with FIGURE 26, the operating arrangement of this invention may be observed. In these block diagrams, the operational functions are indicated as E, H, or M to signify whether the operation of a particular element is primarily electrical, hydraulic, or mechanical. The electrical power supply block 42a represents the motor-generator set 42 mounted on the vehicle 2, as seen in FIGURE 2, and necessary accessories and leads (not shown). Alternating current is delivered from this supply 42a to an electronic power amplifier 43 which is an integral part of the control equipment 13a included generally in console 13, shown in FIGURE 14. The amplifier 43 then receives signals of a particular amplitude, frequency, and wave form from the signal generator 45 when a signal is set in by hand, as indicated by block 46, or by an electrical programmed input, as indicated at 47. The amplifier 43 then delivers an electrical signal of the desired characteristics to an electromechanical transducer 48 located within the servo control valve 49. The transducer 48 is a reciprocating solenoid having a very short stroke which is physically attached to a hydraulic spool valve 52 in the pilot stage valve unit 53. The controlled output through the unit 53 is delivered by hydraulic lines to a power stage valve unit 54 which controls the pressurized hydraulic delivery to and exhaust from the two-way hydraulic actuator 55. Since actuator 55 is directly connected to an upper and lower vibrating mass 75 and 17 (see FIGURE 10), these masses plus the mass of the earth when anchored are identified as load 40 and are moved directly in response to the movement of the actuator 55. The upper and lower masses, together with the actuator 55 and its control valve 49 and feedback equipment, comprise the vibrator 58. Since the lower mass 17 is integrally interlocked with the earth, the earth itself will receive and transmit vibrations which directly follow the movements of the lower mass 17, which are determined by the actuator control valve 49, and which are proportional to the electrical input signals.

A linear potentiometer indicated at 59 is incorporated in the actuator 55 in such a manner as to provide a signal for the position feedback circuit 59a (FIGURES 8 and 26); as the piston 77 moves away from a neutral position of the potentiometer 59, an electrical signal (voltage) is returned to the amplifier 43 through leads 59a. The magnitude of the signal is thus dependent upon the displacement of the potentiometer arm from a neutral position by the travel of actuator piston 77. This potentiometer may be of any suitable construction, one such device being commerically available under the name of "Merkite Linear Potentiometer." A "velocity" feedback 60a also functions from a voltage signal feedback in which the position of the spool in the valve 41 of the power stage 54 of the control valve 49 is determined by an electrical transducer arrangement 60. The transducer 60 is a commercially available differential transformer type of device in which the output of one coil is determined by the relative position of a second coil. An electrical signal is then sent from one of the coils to the amplifier 43 so that the output of the amplifier 43 may be regulated according to the relative position of the spool in its housing. Since the position of the spool in the power stage 54 controls the quantity of pressurized fluid which is sent to the actuator at a particular time, and this quantity determines the velocity with which the actuator piston will move, the feedback here is termed a "velocity" feedback, although it is actually a feedback of information relative to the position of the power stage valve spool. The electrical signal that actuates the electromechanical driver 48 is then the input electrical signal from the signal generator 45 modified by the velocity and position feedback voltages.

The power supply 61 for the actuator 55 includes a high-pressure hydraulic pump 10, which is driven by the truck engine power take-off 63, and supplies pressurized fluid through the accumulator 64 to both the pilot stage 53 and power stage 54 of the control valve 49. Return fluid from the actuator 55 and power stage 54 is sent to an oil reservoir 65 to be picked up by the pump 10 to repeat the pressurized fluid power cycle. In addition to its function of supplying the necessary power for the operation of the actuator 55, the hydraulic power supply 61 also furnishes pressurized fluid for the operating of auxiliary equipment such as that shown in FIGURE 7 as manipulating equipment 26, vehicle isolation equipment 32, and anchor system 33. The vibrator control 13a of FIGURE 7 includes the signal generator 45, its input units, and the electronic power amplifier 43, as well as all of the control switches necessary to operate vibrator 58. The vehicle chassis indicated at block 3 of FIGURE 7 is shown to be mechanically connected to both the vehicle isolation equipment system 32 and the manipulating equipment system 26, since the operation of either 26 or 32 utilizes the vehicle chassis either as the load or as a reference point to react with the load.

No claim is made in this invention to the specific structure of the electrohydraulic servo valve 49 which corresponds to M. B. Manufacturing (or MB Electronics) Company HV–80 nor to the electronic control unit 13 which corresponds to M. B. Manufacturing Company Model HT–101, apart from their novel application to the seismic source, as described herein. The high force short-stroke hydraulic actuator 55, developed for this application, corresponds to M. B. Manufacturing Company Model No. HA–500.

Figure 9:
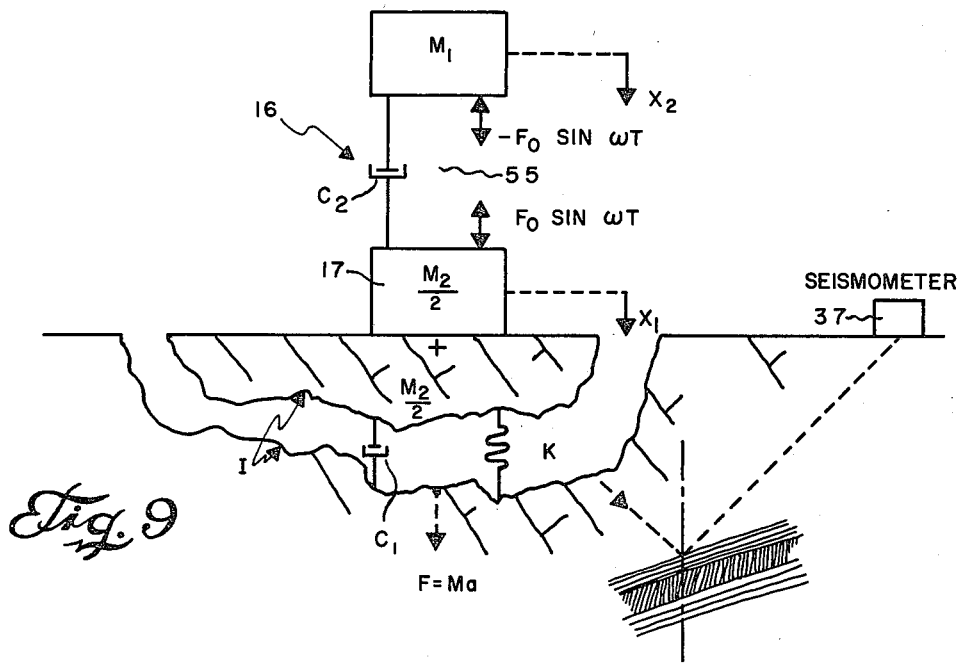
FIGURE 9 is a schematic diagram showing the theoretical earth-mass spring system encountered in employing this invention.
Figure 10:
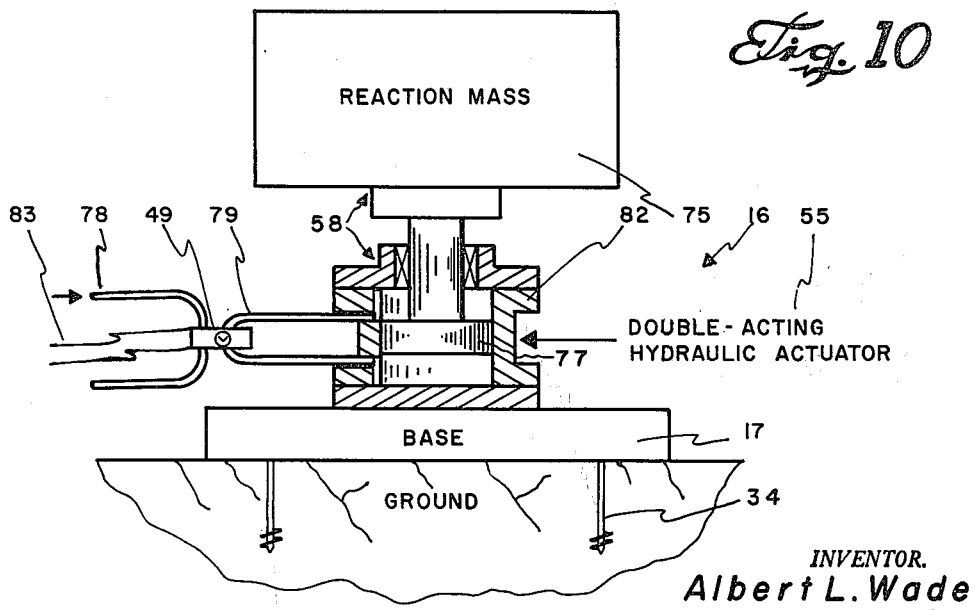
FIGURE 10 is a schematic diagram of one form of the actuator and upper and lower mass employed therewith.

In FIGURES 9 and 10, both the theory and the manner of operation of the vibrator assembly 16 may be observed. The force-applying unit in FIGURE 10 is indicated at 55 to be a double-acting hydraulic actuator which, in operation, has a very short reciprocating stroke of approximately one-half inch. In FIGURE 9, this actuator 55 is seen to apply an energy between the upper and lower masses M1 and M2, which is shown by the formula $F \sin \omega t$ where F is the force applied to the hydraulic actuator (p.s.i. of the hydraulic fluid×square inches of effective piston area) and $\omega$ is the angular velocity, and is a function ($\omega = 2\pi f$) of the frequency $f$ of the signal from the electronic signal generator 45, and $t$ is the instantaneous time at which the energy is calculated. This input energy is effected by the equivalent damping constants C1 and C2 of the earth and actuator 55 and by the equivalent spring constant K of the earth. The theoretical displacement $x$ at a particular time $t$ of a mass M in reciprocal motion is shown by the formula:

$$x = X \text{ max.} \sin \omega t$$

where $\omega$ is the angular velocity that would produce the reciprocal movement of the mass M. The theoretically calculated linear velocity $v$ at a particular time $t$ of the mass M may be shown as the first derivative of the displacement:

$$V = \frac{d \text{ (displacement)}}{dt} = X \text{ max.} \, \omega \cos \omega t$$

and the theoretical acceleration of the mass M would then be shown as the second derivative of the displacement:

$$a = \frac{d^2 \text{ (displacement)}}{dt^2} = -\omega^2 \sin \omega t$$

It is this acceleration times the moving mass that determines the actual force imparted to the earth (at each stroke of the actuator) in accordance with Newton's well-known formula:

$$F = Ma$$

Now, there are certain practical considerations such as the mentioned damping and spring constants and the fact that the upper mass M1 is different (preferably larger) than the lower mass M2 which is distributed partly, though not always equally, between the vibrator lower mass and the earth, and the movements X1 and X2 of the two masses are different. In one embodiment, the upper mass used in tests was 15,000 pounds.

Figure 11:
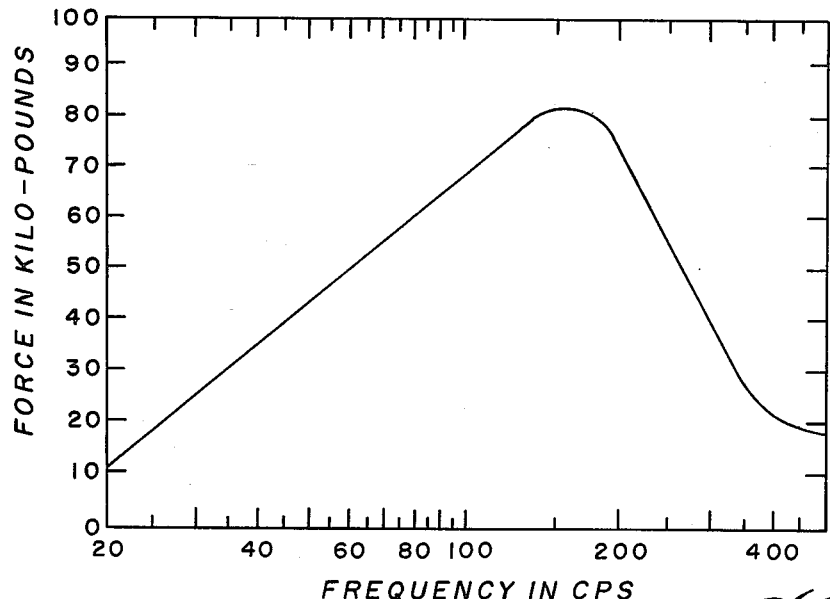
FIGURE 11 is a chart representing the relationship of the input frequency to the force delivered by the vibrator of FIGURES 10 and 25.

In actual tests, the acceleration was measured by an accelerometer, and the comparison between the input signal frequency and the output force may be seen by reference to the chart of FIGURE 11. From this chart, it is seen that maximum force of one device built in accordance with this invention was over 80,000 pounds, and this occurred when the frequency was between 150 and 200 cycles per second.

In FIGURE 10, the actuator 55, represented diagrammatically, is seen to be rigidly attached at its upper end to an upper or reaction mass 75 of substantial weight and attached at its lower end to the base 17 which, in turn, is rigidly anchored to the earth by anchors 34. Hydraulic fluid under pressure is introduced alternately to each side of the piston 77 in the actuator 55 by means of an electrically-driven transducer operated-hydraulic servo control valve 49. Hose or tubing 78 directs pressurized fluid to and from control valve 49, and conduits 79 carry the controlled pressure to and from the actuator cylinder 82. Lead wires 83 permit the electric operation of valve 49 to be controlled from the vibrator console 13 in the cab 9 of the vehicle. In the practical and preferred embodiment shown in FIGURE 25, the cylinder portion of the actuator is attached to the upper mass and the piston is attached to the lower mass for the additional weight advantage gained by the upper mass.

FIGURE 12 is a master diagram of the fluid systems which are employed, as shown, to operate the subsystems of the vibrator 58, the anchor system 33a, the vehicle isolation equipment 32a, and the manipulating equipment 26a, all from a hydraulic power supply 61. The air system 84, also shown on FIGURE 12, is relatively independent of the hydraulic system, except that air is used to control the power take-off 85 by means of solenoid-operated valves 86. The clutch, gear shift, and parking brake are among the air-operated equipment which comprises the air system identified generally at 84.

The hydraulic power supply 61 includes both high and low pressure pumps 10 and 11 (operated by the power take-off 85) and a plurality of control valves 87, accumulators 64, and various other conventional equipment which is normally associated with a conventional truck-mounted hydraulic power supply 61, as herein indicated. Due to the fact that the hydraulic supply 61 is largely conventional and is incorporated in this invention for the purpose of supplying pressurized fluid at high pressure to manifold 88 for operation of the vibrator 58 and at low pressure to manifold 89 for operation of the auxiliary equipment, it need not be described in further detail.

The vibrator lift system 26a may be examined by reference to FIGURE 12 (and FIGURE 4) in which the lift cylinder assemblies 26 are seen to be adapted for two-way operation by virtue of the input-output hose lines 92, which are controlled by solenoid valves 93 operated from the auxiliary control panel 94 in the cab 9.

The vehicle isolation equipment 32a is shown in FIGURE 12 to be comprised of a pair of forward jack assemblies 30 and a pair of rearward jack assemblies 30 which are operated from solenoid valves 96 to raise or lower in response to pressure in a particular hydraulic line 97. Each pair of jacks is also associated with a hydraulic retracting cylinder group 98 and an air-controlled locking group 99 to move and retain the vehicle isolation jacks in a stowed position when the vehicle is made ready to travel from the test site.

The vibrator anchor system 33a is also shown in FIGURE 12, and is there seen to comprise two groups of six linear-moving hydraulic pressure cylinder assemblies 102 and two groups of rotary hydraulic motors 103. Each group comprising a pair of linear-moving cylinders and one rotary motor cooperating to control the movement of an anchor 34 thus form a single anchor unit 33.

The vibrator assembly 16 is shown on FIGURE 12 to be operatively connected by hydraulic line 105 to the high pressure manifold 88, and control valve 49 is seen connected to a return line 106 and accumulators 104 associated with each line.

In FIGURE 13, the electrical control circuit for each of the solenoid-operated valves and other electrical equipment called out in FIGURE 12 may be traced.

Figure 14:
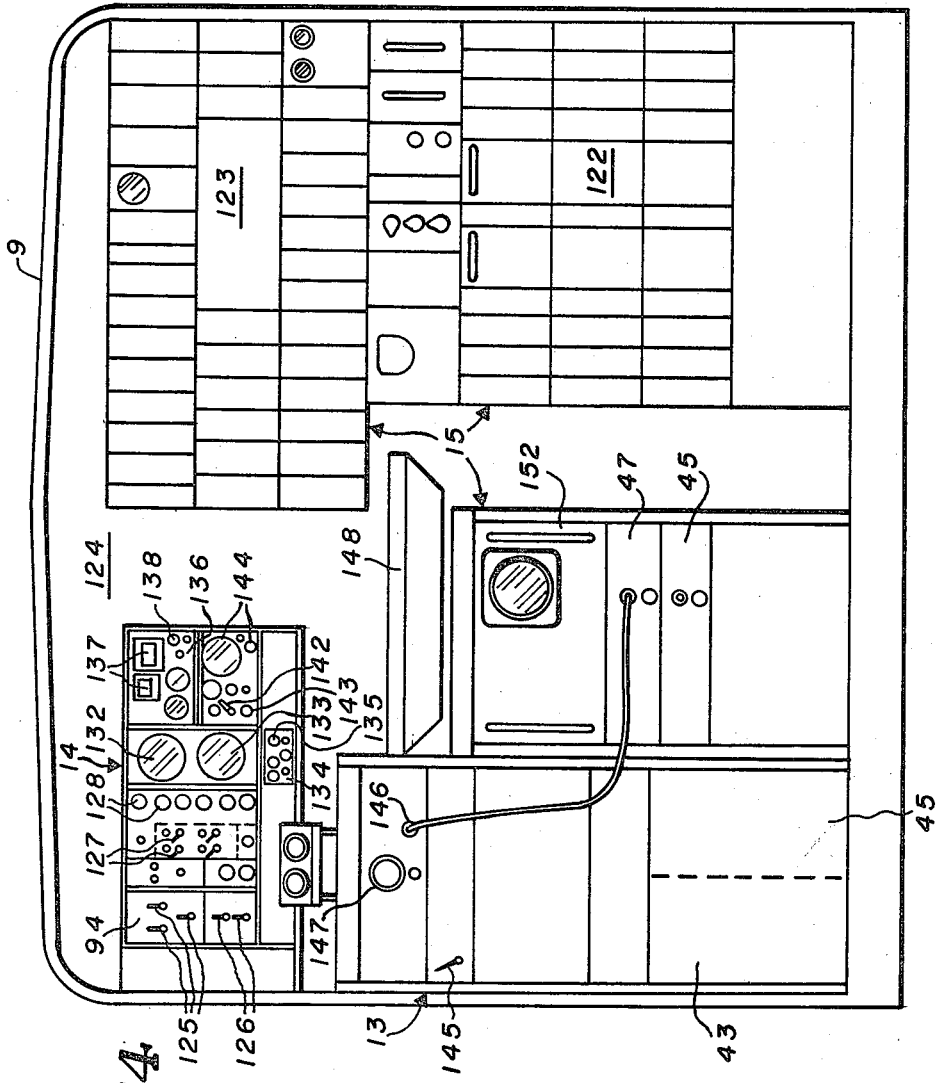
FIGURE 14 is an elevational view of the rear wall of the cab compartment of the vehicle shown in FIGURES 1–6.

FIGURE 14, while showing the rear view of the operator's cab 9, also illustrates the convenient layout for the location of the control panels of the various control equipment associated with this invention. The bulk of the equipment shown in this figure may be identified generally as the analog signal amplifier and power supply 122 and an analog-to-digital converter and multiplexer 123, all of which items are shown in greater detail in the mentioned copending application of Robert S. Foote et al. In the upper left corner of the rear panel 124 of the cab 9 is located an auxiliary equipment control unit 14 including a front panel 94, which includes the necessary manually-operated electric switches 125 for individual operation of each lift cylinder assembly 26. Just below these switches are located a pair of master switches 126 for raising and lowering all three cylinder assemblies 26 in unison. Switches 127 are located at the next section of control panel 94 for the purpose of individually controlling the various jacks 30 of the vehicle isolation mounts 32, and master switches 128 are in this section to permit the mounts 32 to be placed in their operational or stowed position, while other master switches will permit all of the jacks 30 to be operated simultaneously to raise, lower, or level the vehicle frame 3. Moving to the right, the next adjacent section of panel 94 includes the pressure gauges 132 and 133 for the vibrator hydraulic pressure (approximately 3000 p.s.i. average pressure) and for the auxiliary equipment (1500 p.s.i. average pressure) respectively. Below this section are located the pump switches 134 and indicator lights 135. The next section includes an upper and lower control group, the upper group including the necessary switches 136 and gauges 137 and indicator lights 138 for the operational control of the auxiliary motor generator set 42 and the lower group including power take-off switch 142 and lights 143 and various engine switches and gauges identified generally at 144.

Below the auxiliary equipment control panel 94 is located the vibrator control equipment console 13, and this console includes the necessary operational control switches identified generally at 145 and the necessary input jacks 146 and an indicator position gauge 147.

To the right of panel 94 is located in vertical sequence a tape recorder 148, an oscilloscope unit 152, an electrical signal generator 45, an input signal program unit 47, either 45 or 47 being adapted to deliver an electrical signal to the vibrator console 13 so that the electromechanical transducer 48 will cause the actuator 55 to move reciprocally in response to electric signals having selected characteristics; and below the signal generator is a seismic camera which records the vibrations of the various seismometers 37 (FIGURE 9) used in connection with the seismic signal receiving and analyzing equipment 15.

Referring now to FIGURES 15-17, a greater detail of the individual anchor units 33 of anchor system 33a may be observed. The heart of the anchor system is the earth-engaging anchors 34 which include a helical blade 160 at the lower end of a relatively long square shaft 161 which passes through a square driving ring 162 which, in turn, is integrally attached to a driven gear 163 of a gear train 164 which is driven through shaft 165 by hydraulic motor 103. Shaft 161 by this arrangement is free to slide vertically through ring 162, and would not attach the lower mass 17 to the earth in the absence of a threaded section 167 which is secured to mass 17 by a threaded anchor nut 168 after the anchor 34 is at the desired depth in the ground in such a manner that the tightening of this nut binds the mass 17 downward in a compression engagement with the earth. However, it has been found in practice that when signal energy is transmitted to the earth by the lower mass 17, it will actually compress the earth immediately beneath the mass 17, and the adjacent mass of earth (FIGURES 9 and 10) and the mass 17 will no longer vibrate in unison. To overcome this difficulty and to insure that both masses will move together, and in effect create an interface I from which the signal energy will be transmitted, the lower mass 17 must be securely anchored to the earth mass in tension as well as in compression. This anchoring is accomplished by the use of anchor bolts 169 which are inserted by hand into cooperating slots 172 and 173 in both the anchor nut 168 and a tie-down ring 174, which is an integral part of the lower mass 17. The slot 173 in ring 174 includes a shoulder to engage the head of bolt 169, and a washer 175 overlies the slot 172 so that, upon tightening of nuts 176, the anchor nut 168 and tie-down ring 174 will securely engage the lower mass 17 to the anchor shaft 161 and prevent relative movement therebetween either in an upward or downward direction. However, there still remains a possibility that the anchor shaft 161 might, under vibration, rotate in threads 177 and work loose to such an extent that the desired rigid coupling with the earth would not be maintained. This possibility is precluded by the addition of a locknut 178 (after the square extension 204 of FIGURE 15 is removed) whose inner threads 177 match the threads 167 of the shaft 161, but whose outer threads 179 have a different pitch so that, upon tightening of locknut 178 by a spanner wrench, there will be no "play" in the threads and there will be no tendency of the shaft 161 to rotate against the prestressed load thus placed on its threads, as seen in FIGURE 16. The upper end of the threaded section of shaft 161 terminates in a T-section 202 which slideably engages a T-slot 203 in a square bar extension 204 which is used with the main anchor shaft 161 to simultaneously guide and apply downward pressure to the shaft 161 to assist the engagement of the anchor blade 160 into the earth. A pair of double-acting hydraulic cylinders 102 are mounted vertically on frame 206 in a straddling position relative to the shaft 161 and extension 204. The piston rod 207 of these cylinders is attached in guided relation to a yoke ring 208 which loosely surrounds the extension 204, except that upon the insertion of curved exterior, flat interior slips 209, the extension 204, and rotating ring 212 of the yoke 208 become rigidly engaged with each other; when this occurs, with the slips located at the upper side of the yoke 208, as shown in FIGURE 15, the cylinders 102 and their piston rods 207 are adapted to apply an upward lifting force on the extension 204 by virtue of serrations 213 on the interior surface of the slips 209. When the slips 209 are inserted from the bottom of ring 212, the cylinders 205 are then adapted to apply a downward thrust to the extension 204 and anchor shaft 161.

Figure 18:
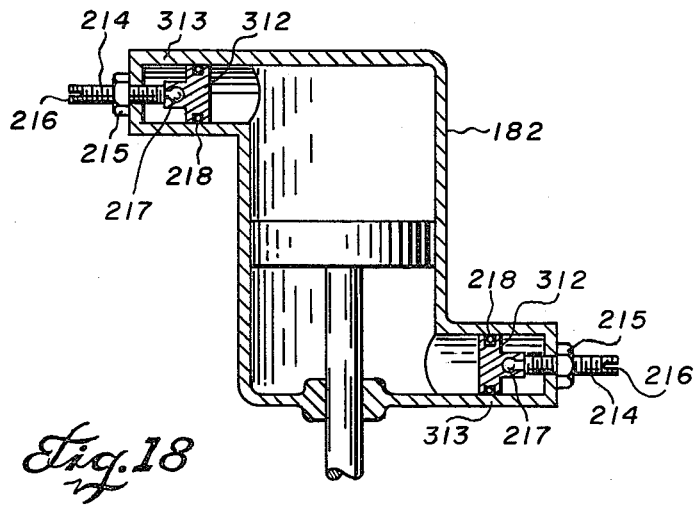
FIGURE 18 is a detailed cross sectional view of a modified actuator for use in this invention.

In FIGURE 18, a modified embodiment 182 of the cylinder of actuator 55 is disclosed wherein the volume of cylinder is adjustable to permit a change in the natural frequency of the vibrating system. It will be apparent from FIGURE 18 that adjustment of the small pistons 312 in the auxiliary cylinders 313 will change the effective internal volume of main cylinder 182 and this, in turn, will change the natual frequency of the hydraulic system if all other factors remain equal. The ability to thus change the natural or resonant frequency of the hydraulic system will result in a method whereby the optimum operating frequency of the complete vibrator assembly may be controlled. The construction of the individual cylinders is such that their threaded piston rods 214 may be rotated in the stationary nut 215 to advance or retract the piston 312. A screwdriver slot 216 is provided in the outer end of the shaft 214, whereas the inner end may be swivel-connected at 217 to the piston 312. By this manner, the pistons 312 will not have to rotate within their cylinder walls, although rotation would be permitted due to the presence of O-rings 218.

FIGURE 19 shows diagrammatically the additional advantage of the separately adjustable vehicle isolation mounts 32 in leveling the vehicle frame 3 when the vehicle is on sloping ground, as is frequently encountered in seismic exploration work. The operator, the vehicle and the instruments will thus not be subject to adverse conditions of the terrain, and by virtue of the isolation mounts, the vehicle will not affect or be affected by the seismic signal. Of equal importance in regard to the leveling action is the feature of permitting the heavy vibrator assembly 16 to be accurately guided and guided without stress to itself or to the vehicle when it is being raised and lowered.

The isolation mounts 32 are shown in enlarged detail in FIGURES 20-22. The left half of FIGURE 20 shows the rear mounts 32 in their lowered or ground-engaging position, whereas the view at the right side of FIGURE 20 shows the rear mounts in their raised or travel position. The small hydraulic cylinders 183 are anchored and pivotally supported from the main frame 3 of the vehicle by bracket 184 and pivot pin 185, and these cylinders 183 are used to locate or position the large jack cylinders 95 of jack assemblies 30 of the vehicle isolation mounts 32 in the following manner: the piston end of cylinder 183 is pivoted at 186 to one end of a bell crank 187 which is itself pivoted at 188 and 189 to the frame 3 and jack cylinder 95 respectively; when fluid pressure is applied to retract the small cylinder 183, the bell crank 187 pivots about pin 188 and 189 and lifts the unit 32 off the ground and up to its stowed position, as shown in the view at the right of FIGURE 20. When the mounts 32 are again lowered to the position shown at the left of FIGURE 20 and lock pins 190 engaged, it is necessary to supply fluid pressure to jack cylinders 95 to raise the vehicle frame 3 and, consequently, the entire vehicle to a position at which the vehicle wheels 4 are clear of the ground. If the ground is sloping, as shown in FIGURE 19, then the ground-engaging pad 192 will pivot at 193 to accommodate this condition. However, it has also been found desirable to tie the two pads 192 together by tie rod 194 to prevent unnecessary lateral strains on the lock pins 190, which would make their retraction difficult. The rear mounts 32 simply retract vertically upward, as shown in FIGURE 20, whereas the front mounts 32 are adapted to be retracted by pivoting about a horizontal axis, as shown in FIGURE 21 and in the plan view of FIGURE 22. In the front mounts, the jack cylinders 95 are supported by a ring 195 which is itself pivotally supported by a bracket 196. The entire bracket 196 is rigidly attached to a horizontally extending shaft 197, connected by bell crank 198 to a double-acting jack 199, which is pivoted at its cylinder end to the main frame 3. When jack 199 is retracted, the entire mount 32 is moved from the vertical position, shown in solid lines in FIGURE 21, to the nearly horizontal position, shown in dotted lines in the same figure. Suitable locking pins, not shown, are also provided for each position.

FIGURE 23 shows a slightly modified embodiment of the isolation mount installation in which lock bands 180 are removably attached to the circumference of the jack cylinders 95 on the "uphill" side of the vehicle only to prevent excess pivotal swing of the cylinders and jacks 30 when transverse leveling is taking place. A mercury switch in the master leveling system will stop the leveling action when leveling is complete. This arrangement will maintain a perpendicular attitude between the jacks 30 and the frame 3 when the leveling is completed (see FIGURE 19). FIGURE 23 also includes a cutaway section of one of the mounts 32 to show the details of construction of the isolation and shock-absorbing and vibration-damping assembly 31 and the means of attaching this assembly to the hydraulic jack 30. Each mount includes a pair of circular sidewalls 38 which form an annular space therebetween to accommodate a stack of resilient "isomode" pads 39. In one design of this invention, the resilient pads were selected to provide a resonant frequency of 2½ c.p.s. to the isolation system. The sidewalls 38 are rigidly clamped between top and bottom plates 70 and 71 by bolts 72 which comprise one-half of the six circumferentially-spaced bolts in the assembly 32. The remaining three (alternately spaced) bolts 73 of the assembly 32 are not rigidly clamped to the bottom plate 71, but to a structure 74 below the plate 71, and attached to ground pad 192 in such a manner that the shoulders 89 of bolts 73 will compress the resilient annular pads 39 under load and, therefore, not transmit vibration either to or from the jacks 30 of truck 2 and the ground pads 192 engaging the surface of the earth.

Figure 24:
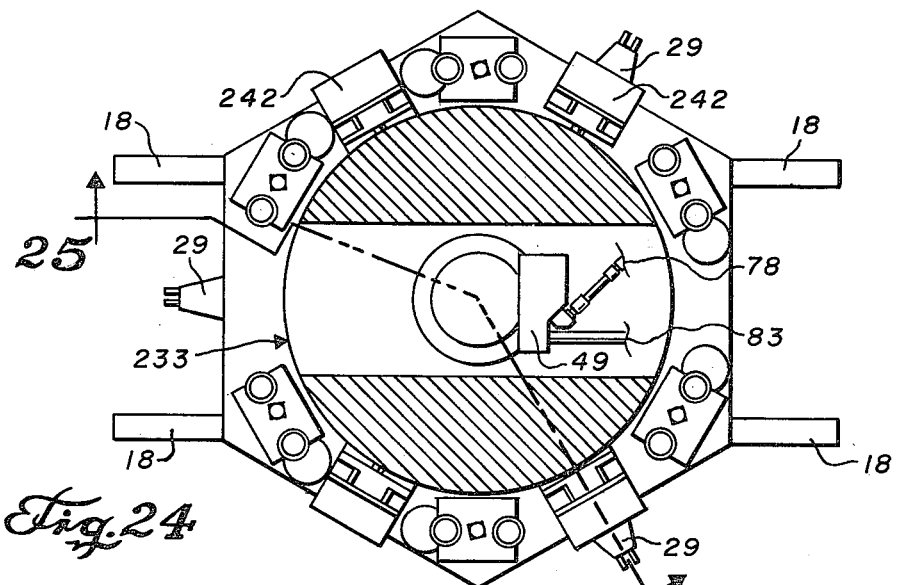
FIGURE 24 is a cross sectional view taken along the lines 24—24 of FIGURE 25.
Figure 25:
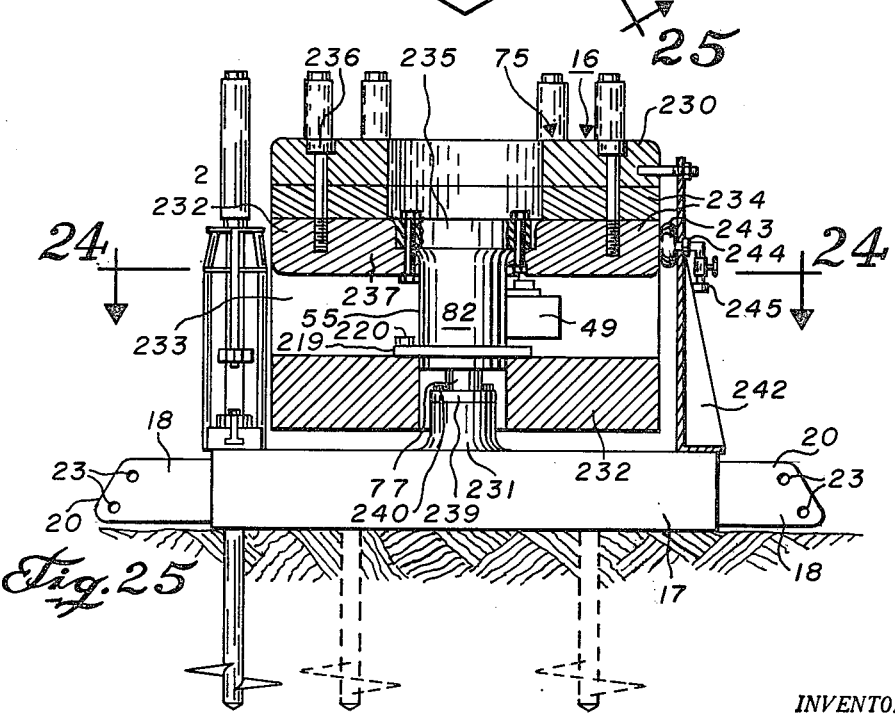
FIGURE 25 is a side elevational view of the vibrator detached from the vehicle and partly in section along the lines 25—25 of FIGURE 24.

In FIGURES 24 and 25, the basic construction of the vibrator assembly 16, as shown in FIGURE 4, is seen to include a large upper mass 75 installed on a centrally-located, upwardly-extending hydraulic actuator cylinder 82 having a heavy-duty piston 77 extending downwardly from the lower end of the cylinder and being removably attached to a boss 231 which is upstanding from the top of the heavy base 17. The upper or reaction mass 75 is made in several pieces, a lower piece 232 including a channel 233 extending laterally therethrough, and an upper piece or pieces 230 and 234 which are locked together with the lower piece above the enlarged cylinder end cap 235. If more or less weight is desired, additional pieces 234 may be added or subtracted from the top and the proper size bolts 236 employed. Bolts 238 engage the ledge 237 of the lower piece 232 with the cylinder cap 235 to secure the upper mass 75 to the actuator 55. The center portion of pieces 230, 232, and 234 are open to permit their insertion around cylinder 82 and to permit the removal of actuator 55 if required. The bottom side of lower piece 232 is spaced from the upper side of base 17 to provide for relative movement between the upper mass and the lower mass. A boss 231 is attached to the top surface of lower mass 17, and provides an attachment for the piston end cap 239 by means of bolts 240. An annular ring 219 is bolted at 220 to the lower surface of channel 233 and is slideably engaged to the circumference of cylinder 82 so as to provide a stabilizing effect to the upper mass 75 relative to the entire vibrator assembly. The servo control valve 49 which passes pressurized fluid into and from the cylinder 82 is attached to the circumference of the cylinder and hydraulic lines 78 and electric leads 83 are attached to the valve 49 with sufficient slack to permit their movement with the actuator cylinder 82. The upper mass 75 is damped against successive lateral movement by stabilizer brackets 242 which are rigidly attached to the base 17, and are attached at several points about the periphery of the upper mass 75 by inflatable lateral force cushioning members 243 held in place between the mass 75 and the bracket 242 by hollow bolts 244, which are rigidly attached to mass 75 and extend through vertical slots in brackets 242. An air supply conduit 245 extends through hollow bolts 244 to control the air pressure within members 243, acting as spacers and keeping the mass 75 in its proper zone of operation even when the vibrator assembly is resting on uneven ground.

The seismic source vibratory system is shown schematically in FIGURE 26, using Joint Industry Conference (JIC) symbols for the hydraulic control valve and actuator to disclose the functional relationship of a servo valve and actuator when used in this specific application to provide a controllable seismic source. Construction details of a servo valve for use with the short stroke actuator developed for and first used in this particular invention are shown in FIGURE 27 and in greater detail by reference to pages 50 and 51 of Electrical Design News magazine of March, 1960.

In FIGURES 26 and 27, the operation of the electrically controlled hydraulically actuated vibrator 58 may be followed. High pressure hydraulic supply lines 78 deliver pressurized fluid to accumulators 64 from the high pressure pump 10. However, once the pressure in the accumulators is built up to the desired level, the pump stops so that, during operation of the vibrator, no extraneous impulses or vibrations from pump operation will be present in the system. When the vibrator control console 13 is energized either from the conventional electrical signal generator 45 or from the especially programmed input generator 47, the output is an electrical control signal in leads 83 which operate the control windings 50 of the electromechanical transducer (or driver) 48 which is directly connected to and operates the spool 52 of the pilot valve 53, which delivers its output of pressurized fluid through conduits 56 to opposite ends of the spool 51 of the power valve 54. Pressurized fluid having this high frequency (0–600 c.p.s.) of operation in the power valve 54 is transmitted through conduits 79 alternatively to opposite sides of the actuator piston 77 so that the vibrator 58 transmits a precisely controlled vibrational signal into the earth through the medium of its attached base 17 which integrally engages a mass of earth. The feedback potentiometer or other type of transducer 59 monitors the position of the actuator 55 and returns a signal via leads 59a to the control console 13 so that a change in electrical signal through leads 83 may take place if the movement of actuator does not correspond to requirements of the initial control signal. The power stage spool 51 also operates a feedback transducer 57 which likewise sends a correction signal back to the console 13.

The operating procedure for using the apparatus of this invention for creating a seismic source and for receiving and utilizing the signals generated thereby may be described basically as follows:

(1) The vehicle 2 is propelled under its own power to the desired seismic exploration site and the vehicle is oriented to a position whereat the ground level in a longitudinal direction of the vehicle is substantially more horizontal than the ground level in a transverse direction of the vehicle.

(2) The ignition control for the main vehicle engine 5, normally operated from the vehicle dash, is transferred to the auxiliary equipment control 14, and the operating switches appear at the lower right section of control panel 94.

(3) The D.-C. power switches and circulating pump switch on this same panel are also turned on.

(4) The engine is allowed to idle, and the power take-off switch is engaged; then, the engine is run at operating speed and the low-pressure hydraulic pump and system are energized.

(5) The vibrator assembly 16 is raised to its fully-up position, and this unloads the locking pins 23a and permits their removal.

(6) Then, the vibrator assembly 16 is lowered approximately two inches from control on auxiliary panel 94, as previously described.

(7) The selector switch 129 on panel 94 (FIGURE 14) is then placed in the position to permit operation of the master switches 128.

(8) Press the master switch 128 labelled "Lower" to cause all the assemblies 32 to lower to their operating position (generally vertical with respect to the ground).

(9) Press the master switch labelled "Pre-Set" to apply a reduced pressure to all jacks 30 in the assemblies 32 to insure that all of the isolation pads have uniform contact with the ground.

(10) Press the master switch labelled "Up" to raise the truck approximately two inches off the ground to allow clearance for levelling and then check the frame 3 for possible twist.

(11) Move the selector switch 129 to the individual control position (to the left in FIGURE 14) and use the individual switches 127 where needed to remove twist or assist in levelling the vehicle, and move the selector switch to the master control position and utilize the master "Level" switch for general levelling of the vehicle.

(12) Remove the T-bolts 169 and lower the vibrator assembly 16 until it has made firm contact with the ground.

(13) Disconnect lift cylinders 26 from the base 17 and raise the lift cylinder pistons to an out-of-the-way position.

(14) Anchor the base 17 to the ground by engaging and driving the anchors 34 to the desired depth. This is done by directing the fluid pressure to both the hydraulic rotary motors 103 to drive the anchors and the downward pressure cylinders 102 to forceably thread the anchors into the earth and prevent churning the soil. Motors 103 may be controlled in banks of three by hand control valve 153 in their hydraulic line 154, and each pair of cylinders 102 may be controlled in banks of three pairs by hand control valve 155 in their hydraulic line 156 by an operator standing near the vibrator assembly 16. As a practical consideration, each hydraulic line 154 and 156 is attached to each component (153 and 155) by a quick disconnect hydraulic fitting so that certain hose lines may be removed to operate only one pair of cylinders and a corresponding hydraulic motor on each side of the vibrator if soil conditions so warrant it.

(15) After all of the anchors 34 and the base 17 are fully engaged with the ground, the cylinder valves 155 are reversed to apply an upward pressure to the anchors 34 and place the mass of earth between the anchors 34 and the base 17 in a prestressed condition.

(16) Install anchor nuts 168 and T-bolts 169 to place the mass of earth beneath base 17 into a compressive load in both directions—from above the anchor nuts and T-bolts and from below by anchors 34.

(17) Install locknuts 178 to prevent the anchor shaft 161 from rotating in the anchor nut threads during vibration.

(18) De-energize the hydraulic circuit and pump. The vibrator hydraulic system will be operated entirely from the high pressure accumulators from this point on.

(19) Pressurize the air cushioning members 243 at the circumference of the vibrator upper mass 75.

(20) Start the auxiliary motor-generator unit 42 and turn on the vibrator control console power which is operated thereby by engaging switch 145 of panel 69.

(21) If accumulator pressure is less than desired actuator pressure (3200 p.s.i. in one embodiment), operate the main engine 5 and allow the desired hydraulic pressure system to build up and then shut off the engine.

(22) Move vibrator piston 77 to its mid-position. The vibrator is now ready for a programmed input.

(23) Operate the vibrator and receive and/or record the reflected or incoming seismic energy.

(24) To pick up the equipment and move to another receiving station or source station, reverse the sequence of operations, shut off the auxiliary equipment, and engage the vehicle engine for transportation.

What is claimed is:

1. An apparatus for imparting seismic energy into the earth comprising a mass having a face of a given area in contact with an equivalent area of the surface of the earth, elongated anchor means provided with flange means thereon secured to and extending substantially below the mass into the earth, means for imparting a reciprocating motion to the mass, to the anchor means and to the flange means, said flange means forcing the earth below the mass to follow the motion of the mass in both upward and downward directions along the longitudinal axis of the anchor means.

2. The apparatus of claim 1, including drive means positioned within the mass and coupled to the anchor means for moving the anchor means in said upward and downward directions to couple the mass to the earth and disengage the mass from the earth.

3. The apparatus of claim 1, wherein the means for imparting a reciprocating motion to the mass includes a double-acting hydraulic piston coupled to the mass, and a reaction mass operatively associated with the piston.

4. A method of seismic exploration comprising the steps of transporting a mass having a face of given area in a suspended position on a vehicle to an exploration site, positioning seismometers at spaced locations from the mass, contacting the face of the mass with an equivalent area of the surface of the earth, coupling the mass to the earth by driving anchors into the earth and securing the anchors to the mass, raising the vehicle so as to isolate the vehicle from the earth, applying vibrational forces to the mass so that the earth below said mass moves in unison therewith, and receiving within the vehicle seismic data from the seimometers in response to seismic waves generated in the earth by the mass.

References Cited in the file of this patent

UNITED STATES PATENTS

| | | |
|---|---|---|
| 2,897,734 | Bodine | Aug. 4, 1959 |
| 2,910,134 | Crawford et al. | Oct. 27, 1959 |
| 2,955,460 | Stevens et al. | Oct. 11, 1960 |
| 2,990,904 | Hawkins et al. | July 4, 1961 |
| 3,024,861 | Clynch | Mar. 13, 1962 |
| 3,034,594 | Menzel et al. | May 15, 1962 |
| 3,034,595 | Thompson | May 15, 1962 |

OTHER REFERENCES

Kinney & Weiss, Applied Hydraulic & Pneumatics, vol. 12, No. 2, February 1957, pp. 67–82.